(12) United States Patent
Oh

(10) Patent No.: US 10,724,792 B2
(45) Date of Patent: Jul. 28, 2020

(54) REFRIGERATOR AND METHOD OF FOOD MANAGEMENT THEREOF

(71) Applicant: Samsung Electronics Co., Ltd, Gyeonggi-do (KR)

(72) Inventor: Jeong-il Oh, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/982,967

(22) Filed: May 17, 2018

(65) Prior Publication Data

US 2018/0335252 A1 Nov. 22, 2018

(30) Foreign Application Priority Data

May 18, 2017 (KR) .................. 10-2017-0061829

(51) Int. Cl.
*F25D 29/00* (2006.01)
*F25D 23/02* (2006.01)
*G06K 9/62* (2006.01)
*G06K 9/00* (2006.01)

(52) U.S. Cl.
CPC ........ *F25D 29/005* (2013.01); *F25D 23/028* (2013.01); *F25D 29/00* (2013.01); *G06K 9/00671* (2013.01); *G06K 9/00771* (2013.01); *G06K 9/6256* (2013.01); *F25D 2400/361* (2013.01); *F25D 2500/06* (2013.01); *F25D 2700/04* (2013.01); *F25D 2700/06* (2013.01); *G06K 2209/17* (2013.01)

(58) Field of Classification Search
None
See application file for complete search history.

(56) References Cited

U.S. PATENT DOCUMENTS

| 8,250,871 B2 | 8/2012 | Kwon | |
| 2015/0002660 A1* | 1/2015 | Lee | F25D 29/00 |
| | | | 348/135 |

(Continued)

FOREIGN PATENT DOCUMENTS

| CN | 106885447 | 6/2017 |
| JP | 2003004367 A | 1/2003 |

(Continued)

OTHER PUBLICATIONS

International Search Report dated Aug. 14, 2018 in connection with International Patent Application No. PCT/KR2018/005244, 4 pages.

(Continued)

*Primary Examiner* — Heather R Jones

(57) ABSTRACT

A refrigerator and a food management method are provided. The refrigerator includes a main body that includes a storage. The refrigerator also includes a door configured to be hinged to the main body to rotate on a front side of one side of the storage and include a display. The refrigerator also includes a camera positioned on a front surface of the door and configured to photograph food to be recognized. The refrigerator also includes a controller configured to control the display, and the first camera. The controller is configured to display on the display a food name corresponding to an image of food, photographed by the first camera.

12 Claims, 15 Drawing Sheets

(56) References Cited

U.S. PATENT DOCUMENTS

| | | | | |
|---|---|---|---|---|
| 2015/0161871 A1* | 6/2015 | Kim | ................. | A61B 5/1171 |
| | | | | 340/539.12 |
| 2016/0063734 A1 | 3/2016 | Divakaran et al. | | |
| 2016/0153701 A1 | 6/2016 | Kim | | |
| 2016/0217417 A1* | 7/2016 | Ma | ................. | G06Q 10/087 |
| 2018/0266751 A1 | 9/2018 | Lim et al. | | |

FOREIGN PATENT DOCUMENTS

| | | |
|---|---|---|
| JP | 2017-133803 A | 8/2017 |
| KR | 10-2007-0078939 A | 8/2007 |
| KR | 10-2011-0007663 A | 1/2011 |
| KR | 10-2015-0001921 A | 1/2015 |
| KR | 10-2015-0127012 A | 11/2015 |
| KR | 10-2016-0000931 A | 1/2016 |
| KR | 10-2017-0028238 A | 3/2017 |

OTHER PUBLICATIONS

Written Opinion of the International Searching Authority dated Aug. 14, 2018 in connection with International Patent Application No. PCT/KR2018/005244, 10 pages.

Supplementary European Search Report dated Jan. 9, 2020 in connection with European Patent Application No. 18 80 2027, 12 pages.

* cited by examiner

REFRIGERATOR AND METHOD OF FOOD MANAGEMENT THEREOF

CROSS-REFERENCE TO RELATED APPLICATION AND CLAIM OF PRIORITY

This application is based on and claims priority under 35 U.S.C. § 119 to Korean Patent Application No. 10-2017-0061829 filed on May 18, 2017, filed in the Korean Intellectual Property Office, the disclosure of which is incorporated herein by reference in its entirety.

BACKGROUND

The present disclosure relate to a refrigerator and a method of food management of the refrigerator, and more particularly, to a refrigerator having a front camera positioned on a front surface of a door and an inner camera, and a method of food management of the refrigerator.

A refrigerator is an electronic apparatus (or home appliance) which is capable of keeping food which is edible and drinkable cold and frozen through a refrigeration cycle using a refrigerant. A refrigerator may store not only food but also medicine, alcoholic liquor or cosmetics.

The advancement of technology has enabled a refrigerator to be used as a storage but also to provide a variety of services through data transmission/reception or an installed (or downloadable) application.

SUMMARY

One or more example embodiments provide a refrigerator, comprising: a main body having a storage; a door configured to be hinged to the main body to rotate on a front side of one side of the storage and have a display on a front surface of the door; a first camera configured to be positioned on a front surface of the door and photograph food to be recognized; and a controller configured to control the display and the first camera. The controller may control, by using a food image photographed by the first camera, a food name corresponding to the food image to be displayed on the display.

According to an aspect of the present disclosure, the refrigerator may include a user approach detector configured to detect an approach of a user with respect to the refrigerator. The user approach detector may include at least one of a microphone, the first camera and a proximity sensor.

According to an aspect of an example embodiment, there is provided a food management method of a refrigerator, the method comprising: detecting a user approach through a user approach detector positioned on a front surface of a door of the refrigerator; displaying a screen of a food management application on a display positioned on the front surface of the door of the refrigerator in response to the user approach being detected; photographing food to be recognized adjacent to the display through a first camera; recognizing a food image corresponding to the photographed food; and displaying food information corresponding to the food on the display according to a result of the recognition.

The food management method may further include distinguishably displaying a location at which the food is stored in a storage within the refrigerator according to the food information.

The location at which the food is stored may be distinguishably displayed on an inside of the storage photographed by a second camera.

According to another aspect of an example embodiment, there is provided a refrigerator, comprising: a main body having a storage; a storage configured to store a first comparison food image; a door configured to be hinged to the main body to rotate on a front side of one side of the storage and have a display on a front surface of the door; a camera configured to be positioned on a front surface of the door and photograph food to be recognized; and a controller configured to control the storage, the display and the camera. The controller may preferentially recognize a food image photographed by the camera according to a food recognition search order by using the first comparison food image of the storage and control a food name corresponding to the photographed food image to be displayed on the display.

According to another aspect of an example embodiment, there is provided a main body having a storage, a first door configured to hinged to the main body to rotate on a front side of one side of the storage and have a display on a front surface of the first door; a first camera configured to photograph food to be recognized, the first camera being positioned on a front surface of the first door, a second door configured to be hinged to the main body to rotate on a front side of the other side of the storage; and a controller configured to control the display and the first camera. The controller controls a food name corresponding to the food image on the display by using a food image photographed by the first camera.

According to another aspect of an example embodiment, there is provided a main body having a storage, a storage configured to store a comparison food image, a door configured to hinged to the main body to rotate on a front side of one side of the storage and have a display on a front side of the door, a camera configured photograph food to be recognized, the camera being positioned on a front surface of the door; and a controller configured to control the display and the camera. The controller recognizes a food image photographed by the camera by using a pre-stored comparison food image according to a food recognition search order with respect to a plurality of storages and controls a food name corresponding to the photographed food image to be displayed on the display. The plurality of storages include the storage, a storage of the server and a storage of a store server.

According to an aspect of an example embodiment, the refrigerator may further include a communication interface. The controller may recognize a food image photographed by the camera by using a second comparison food image stored in a storage of an external server connected via the communication interface according to the food recognition search order and control a food name corresponding to the photographed food image to be displayed on the display.

According to an aspect of an example embodiment, the controller may recognize a food image photographed by the camera by using a third comparison food image stored in a storage of a store server connected via the communication interface according to the food recognition search order and control a food name corresponding to the photographed food image to be displayed on the display.

According to an aspect of an example embodiment, the controller 110 may recognize a food image photographed by the camera by using a search engine via the communication interface according to the food recognition search order and control a food name corresponding to the photographed food image to be displayed on the display.

A refrigerator in which a display and a first camera adjacent to the display are positioned on a front surface of a door may be provided.

A refrigerator in which a display and a first camera positioned to be inclined from a front surface of a door at a set angle on a front surface of the door may be provided.

A refrigerator which is capable of recognizing a food image photographed by a first camera of the front surface of the door and a food management method of the refrigerator may be provided.

A refrigerator which is capable of recognizing a food image photographed by a first camera of the front surface of the door through machine learning and a food management method of the refrigerator may be provided.

Through a first camera of a front surface of a door and machine learning, the user may be provided with a refrigerator in which food is easily registrable and a food management method of the refrigerator.

A refrigerator which is capable of recognizing a food image photographed by a first camera of the front surface of the door through deep learning and a food management method of the refrigerator may be provided.

Through a first camera of a front surface of a door and deep learning, the user may be provided with a refrigerator in which food is easily registrable and a food management method of the refrigerator.

A refrigerator which is capable of recognizing a food image photographed by a first camera of the front surface of the door by using a feature point of image and a food management method of the refrigerator may be provided.

A refrigerator which is capable of recognizing a food image photographed by a first camera of the front surface of the door by using a feature point of image and/or a feature amount of image and a food management method of the refrigerator may be provided.

Through a first camera of a front surface of a door and a second camera which photographs a storage, a refrigerator managing food and a food management method of the food may be provided.

Through a first camera of a front surface of a door and a second camera which photographs a storage, a refrigerator managing food storage period and a food management method of the food may be provided.

According to the various example embodiments, through a first camera of a front surface of the door, a second camera which photographs a storage and machine learning, the user may be provided with a refrigerator in which food is easily registrable and a food management method of the refrigerator may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
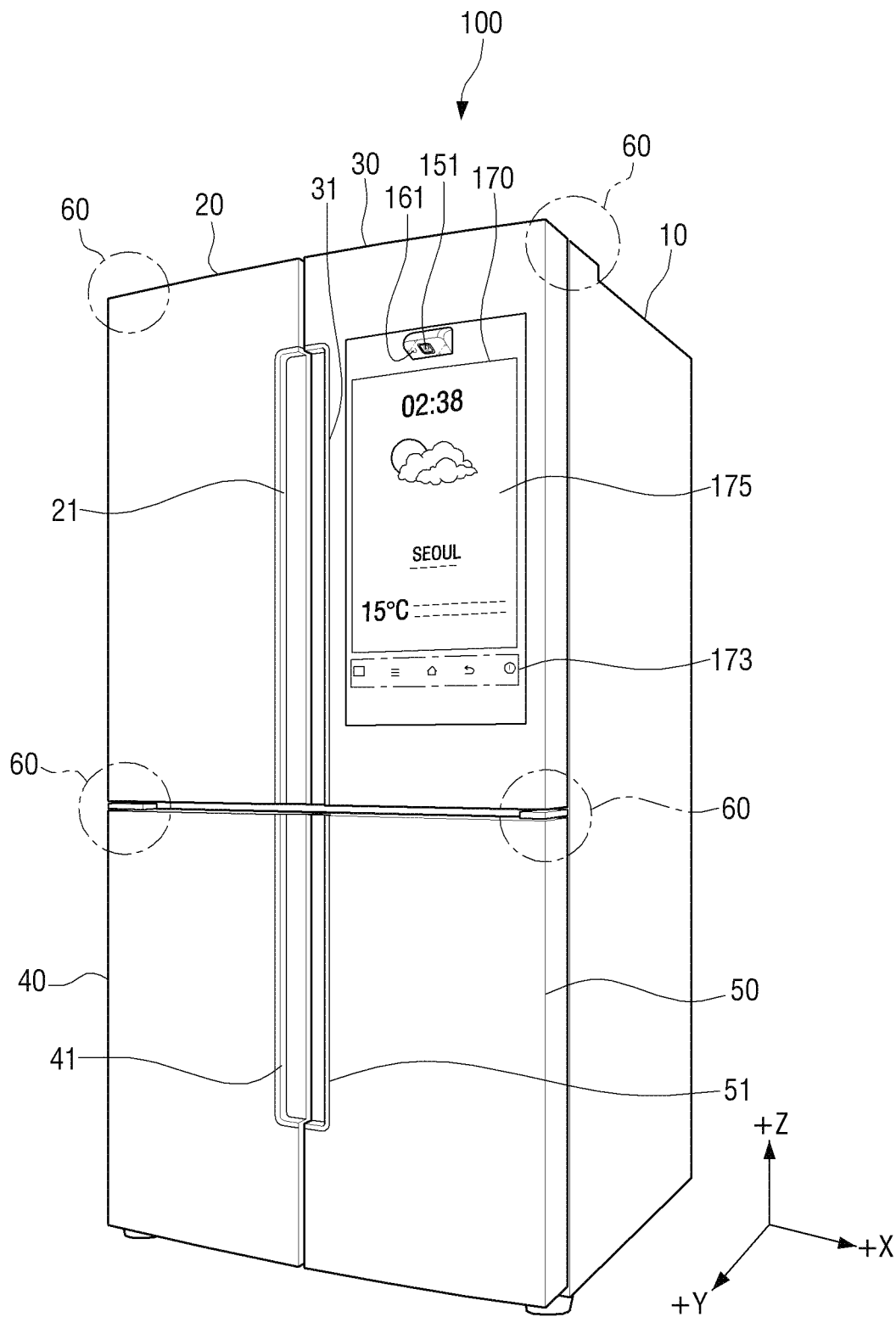
FIG. 1A illustrates a perspective view of a refrigerator having a front camera and a display, according to an embodiment of the present disclosure.

FIGS. 1A through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, exemplary embodiments of the present disclosure will be described in detail with reference to the accompanying drawings. Exemplary embodiments of the present disclosure will now be described in greater detail with reference to the accompanying drawings. In the following description, same drawing reference numerals are used for the same elements even in different drawings.

Terminology including an ordinal number such as "first," "second," and so on may be used to describe a variety of constituent elements, but the elements are not limited by the terminology. In embodiments of the present disclosure, relational terms such as first and second, and the like, may be used to distinguish one entity from another entity, without necessarily implying any actual relationship or order between such entities. For example, a first element may be named a second element without departing from the scope of right of various example embodiments, and similarly, a second element may be named a first element. As used herein, the term "and/or," includes any and all combinations of one or more of the associated listed items.

According to an example embodiment, the application refers to an operation system (OS) for computers or software executed on a mobile OS to be used by a user. For example, the application may include a web browser, a camera application, a mobile payment application (or, electronic payment application or payment application), a photo album application, a word processor, a spread sheet, a contacts application, a calendar application, a memo application, an alarm application, a social network system (SNS), a call application, a game store, a game application, a chatting application, a map application, a music player or a video player.

According to an example embodiment, an application may refer to a refrigerator or software which is executed in an external device (e.g., wearable device, server, and the like) connected to the refrigerator via wire or wirelessly. According to an example embodiment, an application may refer to software which is executed in a refrigerator in response to a user input that is received.

A content may be executed or displayed through an application which is executed correspondingly. For example, a content may include a video file or audio file which is executed in a video player, which is one of the application, a video file or an audio file, a game file which is executed in a game application, a music file which is reproduced in a music player, a photo file which is displayed in a photo album application, a web page file which is displayed in a web browser, or payment information (e.g., mobile card number, payment amount, product name, service name or store name) which is displayed on an electronic payment application. In addition, a content may include a call screen (e.g., including caller ID, caller name, call start time, or caller video (or caller image) by a video call) which is displayed in a call application.

A content may include a screen of an application (or widget) being executed and a user interface which configures the application screen. In addition, a content may include one or a plurality of contents as well.

The widget refers to a mini application which is one of the GUIs for facilitating an interaction between a user and an application or between the user and an operating system (OS). For example, the widget may include a weather widget, a calculator widget, a clock widget, etc.

In an example embodiment, "user input" may be a term which includes, for example, selection of a button (or key) by a user, depress (or click) of a button (or key) by a user, touch of a soft button (or soft key) by a user, a touch (including non-contact such as hovering) received (or detected) in a touch screen by a user, a touch gesture (including non-contact such as hovering, a user voice, a user presence (e.g., a user appears within a recognition range of a camera) received (or detected) in a touch screen by a user, or a user motion. In addition, 'selection of a button (or key)' may be used to refer to a press (or click) of a button (or key) or a touch of a soft button (or soft key).

Terms used in the present specification are used only in order to describe specific exemplary embodiments rather than limiting the present disclosure. It is to be understood that the singular forms "a," "an," and "the" include plural referents unless the context clearly dictates otherwise. Throughout this specification, it will be understood that the term "comprise" and variations thereof, such as "comprising" and "comprises", specify the presence of features, numbers, steps, operations, components, parts, or combinations thereof, described in the specification, but do not preclude the presence or addition of one or more other features, numbers, steps, operations, components, parts, or combinations thereof. Like reference numerals in the drawings denote members performing substantially the same function.

FIG. 1A illustrates a perspective view of a refrigerator having a front camera and a display, according to an embodiment of the present disclosure.

Figure 1B:
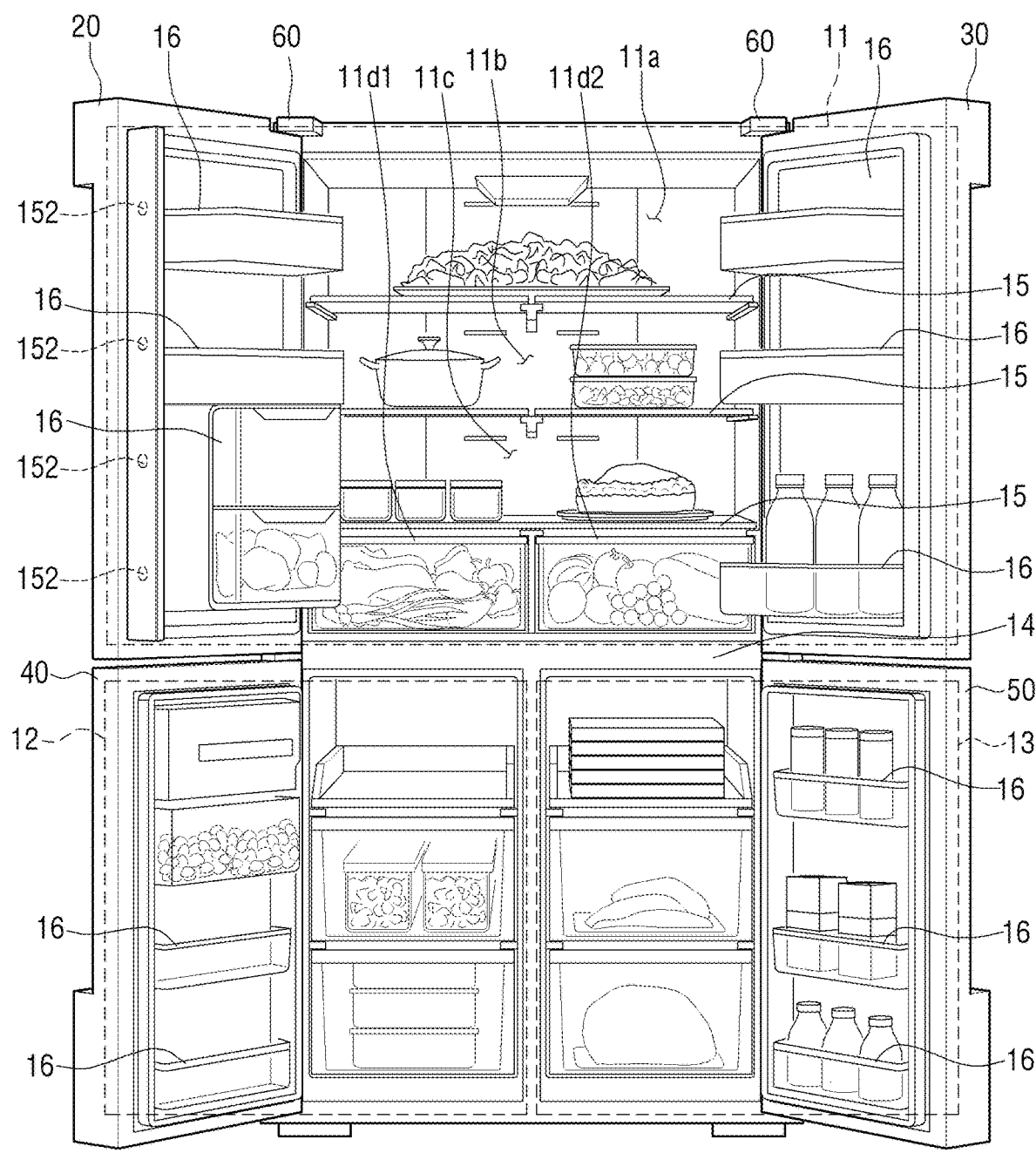
FIG. 1B illustrates a front view of a refrigerator of which all doors are opened, according to an embodiment of the present disclosure.

FIG. 1B illustrates a front view of a refrigerator of which all doors are opened, according to an embodiment of the present disclosure;

Referring to FIGS. 1A and 1B, a refrigerator 100 includes a main body 10, a storage 11, 12, 13, a door 20, 30, 40, 50, and a hinge 60 which connects each of the doors 20, 30, 40, 50 with the main body 10. A display (or touch screen, 170) which displays a content may be positioned on at least one (e.g., at least one of a right door 30 and a left door 20) of a plurality of doors.

A camera (or front camera, 151) may be positioned on at least one (e.g., at least one of a right door 30 and a left door 20) of a plurality of doors. A proximity sensor 161 may be positioned to be adjacent (e.g., within a radius of 500 mm) to the front camera 151. In addition, a microphone 140 may be positioned on at least one (e.g., at least one of a right door 30 and a left door 20) of a plurality of doors.

The refrigerator 100 may be divided into types according to a shape of a storage and a door. A top mounted freezer (TMP) type refrigerator includes a freezer which is formed on an upper surface of the storage horizontally partitioned by a partition and a cold room which is formed on the lower side of the storage. A bottom mounted freezer (BMF) type refrigerator includes a refrigerator which is formed on an upper side of a storage horizontally partitioned by a partition and a freezer which is formed on the lower side of the storage.

A side by side (SBS) type refrigerator includes a freezer which is formed on one side of the storage vertically partitioned by a partition and a cold room which is formed on the other side of the storage. A French door refrigerator (FDR) refrigerator includes a cold room which is formed on an upper side of the storage horizontally partitioned by a partition and a freezer which is formed on a lower side of the storage. A cold room on the upper side may be opened and closed by a pair of doors. In the FDR refrigerator, both the upper cold room and the lower cold room may be opened and closed by a pair of doors.

The main body 10 includes an inner case (not illustrated) which forms the storage 11 to 13, an outer case (not illustrated) which forms an exterior of the refrigerator, and an insulator (not illustrated) which maintains a temperature difference between the inner case (not illustrated) and the outer case (not illustrated). An insulation material (not illustrated) may prevent a cold inner air from leaking outside, and prevent the outside warm air from entering the storage 11 to 13.

The main body 10 includes a cool air supply unit (not illustrated) which supplies cool air to the storage 11 to 13. The cool air supply unit (not illustrated) may include a compressor 181 (see FIG. 2) which compresses a refrigerant, a condenser (not illustrated), an expansion valve (not illustrated), an evaporator (not illustrated), and a pipe (not illustrated).

The storage 11 to 13 is divided by a partition 14. The storage 11 to 13 is divided into a lower freezer storage room 12 and 13 (hereinafter referred to as "freezer") and a cold storage room 11 (hereinafter referred to as "cold room" above the freezer room 12 and 13. The storage 12 may be set to a temperature of over zero (e.g., between 0° C. to 7° C.) or below zero (e.g., between −1° C. to −5° C.) and store water, beverages, food ingredient, and cold or frozen food. Water or beverages may be stored in a beverage container.

The cold room 11 from among the storage 11 to 13 which is divided by a partition 14 may include one or more shelves 15 and one or more storage boxes 16.

The cold room 11 is attached to one side (e.g., left side) of the storage 11 and a second door 30 which is adjacent to the first door 20 and positioned on the other side (e.g., right side). The first door 20 and/or the second door 30 may be rotated at an angle (e.g., 300° or less) set by each hinge 60 and open or close (e.g., attach or detach) a front surface of the storage 11. The first door 20 may be rotated the opposite way to a rotation direction of the second door 30 and open or close the storage 11. The positions of the first door 20 and the second door 30 may be mutually changed.

The first door 20 is rotated at an angle (e.g., 300° or less) set by a hinge 60 and open or close a portion of the front surface of the storage 11 (e.g., between 35% to 70% of the front surface of the storage 11).

A dispenser (not illustrated) which provides water, ice or sparkling water to the front surface (e.g., +y-axis direction) of the first door 20 and/or a grabbable handle 21.

The second door 30 is rotated at an angle (e.g., 300° or less) set by a hinge 60 and open or close a portion of the front surface of the storage 11 (e.g., between 35% to 70% of the front surface of the storage 11). The second door 30 may include a grabbable handle 31. The handle 21 of the first door 20 and the handle 31 of the second door 30 are positioned to be spaced apart in the left and right directions based on a center area of the storage 11.

A function and stored setting of the refrigerator 100 may be displayed on the front surface (e.g., +y-axis direction) of the second door 30. A user input (e.g., touch or selection of a button 173) may be received in the front surface of the second door 30. A display (or a touch screen 170) which is capable of displaying (or executing) a screen of an application (including a widget) may be positioned at the front surface of the second door 30. The button 173 may be included in the touch screen 170 or may be positioned separately from the touch screen 170. The button 173 may be a button which is displayed on a touch screen, a touch button or a physical button.

A vegetable compartment 11*d*1 and 11*d*2 is positioned below the storage 11. The vegetable compartment 11*d*1, 11*d*2 may be withdrawn (e.g., slid or rolled) toward the front side (e.g., y-axis direction).

The storage 12 may have a door 40 on one side. The storage 13 may have a door 50 on one side. The storage 12 and 13 may be combined into one storage (e.g., like the storage 11). One storage (not illustrated) may have a door (not illustrated) on each of the left side and the right side like the storage 11. In addition, a refrigerator may have a drawer (not illustrated).

Figure 2:
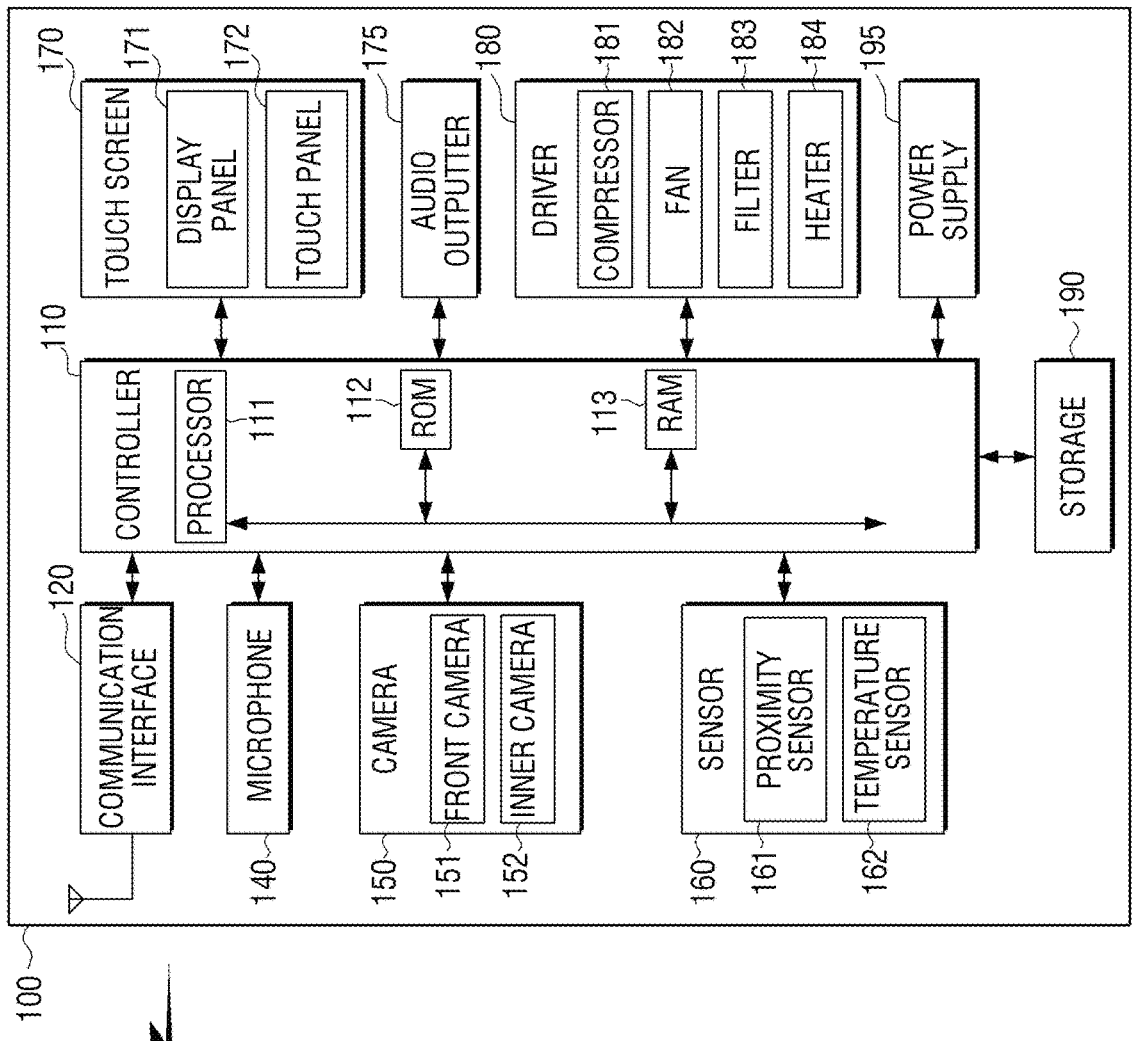
FIG. 2 illustrates a block diagram of a refrigerator having a front camera and a display, according to an embodiment of the present disclosure.

FIG. 2 illustrates a block diagram of a refrigerator having a front camera and a display, according to an embodiment of the present disclosure.

Referring to FIG. 2, a refrigerator 100 may be functionally connected with an external apparatus 200 by using a communication interface 120. The external apparatus 200 may include a server 210, an external apparatus 200 including a smartphone, a home appliance apparatus 230 including an air conditioner, a washing machine and the like, or a display apparatus 240 including a TV.

The refrigerator 100 may transmit operation information corresponding to an operation (e.g., temperature control of each storage) of the refrigerator and state information corresponding to a state (e.g., normal, abnormal, and the like) of the refrigerator 100 to the external apparatus 200 via the communication interface 120, or may receive control information (e.g., a control command corresponding to quick freezing of the refrigerator 100) from an outside source.

The refrigerator 100 may include a controller 110, a communication interface 120, a microphone 140, a camera 150, a sensor 160, a touch screen 170, an audio outputter 175, a driver 180, a storage 190, and a power supply 195. In addition, the refrigerator 100 may further include a sensor (e.g., temperature sensor (not illustrated) or overheat sensor (not illustrated), and the like, 169).

The controller 110 may include the processor 111. The controller 110 may store a non-volatile memory which includes ROM 112 that stores a control program for controlling the refrigerator 100 and a volatile memory which includes RAM 113 that stores a signal or data inputted from outside the refrigerator 100 or is used as a storage area with respect to various operations performed on the refrigerator 100. The RAM 113 may be used as a storage area with respect to control information received from an external source, operation information of the refrigerator 100 or state information of the refrigerator 100.

The controller 110 serves to control a signal flow between the overall operation of the refrigerator 100 and the internal components 110 to 195 of the refrigerator 100 and process data. The controller 110 may control the power supply to the internal elements 120 to 195 by using the power supply 195. The processor 111, the ROM 112, and the RAM 113 may be connected with one another by a bus.

The controller 110 may control the communication interface 120, the microphone 140, the camera 150, the sensor 160, the touch screen 170, the audio outputter 175, the driver 180, the storage 190, and the power supply 195.

In an example embodiment, a refrigerator includes a main body having a storage, a first door having a display on a front surface thereof and hinged on the main body to be rotated on the front side of one side of the storage, a first camera configured to photograph food which is an object to be recognized, a second door which is hinged on the main body so that it is rotated on a front side of the other side of the storage, and a controller configured to control the display and the first camera. The controller controls, by using a food image photographed by the first camera a food name corresponding to the food image to be displayed on the display.

The controller 110 may control the display to display a screen of a food management application in response to the user approach.

The controller 110 may control an image of the food captured through the first camera to be recognized through a learning model by using the food management application.

The refrigerator may further include a storage configured to store a training data corresponding to the learning model. The controller 110 may control an image of the food to be recognized through the learning model.

The controller 110 may control to attempt recognition of the photographed image of the learning model in the determined order of the storage configured to store the training data, an external server, a server of an external store, and a web search engine.

The controller 110 may control to perform a preview corresponding to the food by using the first camera.

The controller 110 may control food information corresponding to the food image to be displayed on the display.

The controller 110 may control a storage position within the storage of the food in the food information to be displayed through the display by using a second camera to photograph the storage.

In a case in which the food is stored in the storage position within the storage, the controller 110 may control a storage period of the stored food to be displayed on the display.

The controller 110 may control an arrival of a storage period limit of the food to be displayed on the display by using a storage period of the food information.

The controller 110 may control an arrival of the storage period limit of the food to be transmitted to an external apparatus via the communication interface.

In another example embodiment, a refrigerator includes a display which is hinged to the main body to rotate on a front side of a storage, the display being disposed on a front surface of a door, a first camera which photographs a food which is an object to be recognized, the first camera being positioned on a front side of the other side of the storage, a second door which is hinged to the main body so that it is rotated on a front side of the other side of the storage, and a controller which controls the display and the first camera and controls a food name corresponding to the food image to be displayed on the display by using a food image photographed by the first camera.

In another example embodiment, a refrigerator includes a main body having a storage, a storage configured to store a first comparison food, a door which is hinged to the main body to rotate on a front side of one side of the storage, the door having a display on a front surface thereof, a camera configured to photograph food which is an object to be recognized, the camera being positioned on a front surface of the door, and a controller configured to control the storage, the display and the camera. The controller preferentially recognizes a food image photographed by the camera by using the first comparison food image of the storage according to a food recognition search result, and controls a food name corresponding to the photographed food image on the display.

A refrigerator may further include a communication interface. The controller 110 may recognize a food image photographed by the camera by using a second comparison food image stored in a storage of an external server connected via the communication interface according to the food recognition search order, and controls a food name corresponding to the photographed food image to be displayed on the display.

The controller 110 may recognize a food image photographed by the camera by using a third comparison food image stored in a storage of an store server connected via the communication interface according to the food recognition search order, and controls a food name corresponding to the photographed food image to be displayed on the display.

The controller 110 may recognize a food image photographed by the camera by using a search engine through the communication interface according to the food recognition search result, and controls a food name corresponding to the photographed food image to be displayed on the display.

According to an example embodiment, the term "controller of a refrigerator" as used herein may be a concept which includes the processor 111, the ROM 112, and the RAM 113. In addition, "a controller of a refrigerator" may refer to the processor 111.

The communication interface 120 may connect with an external devices 210 to 240 via a mobile communication network, a wireless LAN communication network, or a near field communication network by using one antenna or two or more antennas under the control of the controller 110. The wireless LAN communication may be wirelessly connected with an access point (AP) at a location where the AP is installed under the control of the controller 110. For example, the wireless LAN communication may include a Wi-Fi communication. The near field communication may include a Bluetooth communication, a Bluetooth low energy communication, an infrared data association (IrDA) communication, a ultra-wideband (UWB) communication, a magnetic security transmission (MST) communication and/or an NFC communication.

According to the various example embodiments, the term "communication interface" may be connect with an external device via a mobile communication, a wireless LAN communication and/or near field communication.

A microphone 140 may generate (or convert) a voice or sound which is received from an external source to an electric signal under the control of the controller 110. The electric signal which is generated by the microphone 140 may be converted in an audio codec under the controller of the controller 110 and stored in the storage 190 or outputted through the audio outputter 175.

The camera 150 may photograph a still image or record a video under the control of the controller 110. The camera 150 may photograph a still image or record a video for registration and/or management of food. The camera 150 may photograph an iris of the user under the control of the controller 110.

The camera 150 includes a front camera (or a first camera, 151) which is positioned on a front side of the refrigerator 100 and an inner camera (or a second camera, 152) which is positioned inside the refrigerator 100. In addition, an iris photographing camera (not illustrated) which photographs an iris of a user may be positioned on one side of the front camera 151.

The front camera (or an optical axis of the front camera 151) may be inclined at a set angle (e.g., less than 85°) towards a front side (e.g., +y-axis direction) based on the front side (or surface) of the door 30. The above-mentioned setting angle may be 75 degrees or less or may be 35 degrees or more. In addition, the above-mentioned setting angle may be 65 degrees or less or may be 15 degrees or more. In a case in which the front camera 151 faces the front side (e.g., +y-axis direction), the user needs to lift food which is an object to be photographed into a photographing range (e.g., a view angle) of the front camera 151. The front camera 151 which is inclined at a set angle can easily (or with a little power) photograph food which is an object to be photographed under the control of the controller 110.

One of the front camera 151 and the inner camera 152 may include an auxiliary (e.g., flash (not illustrated) which provides an amount of light required for photographing. In addition, an auxiliary light source (e.g., an LED for iris recognition, not illustrated) required for photographing an iris may be positioned on a front surface of the refrigerator 100.

One front camera 151 or a plurality of front cameras 151 may be included. One or more inner cameras 152 may be positioned on a rear surface of the door 20 to 50 which faces the storage 11 to 13 according to an area of the storage. For example, one or more inner cameras 152 may be positioned on a rear surface of the door 20 and 30 which faces the storage 11. One or more inner cameras 152 may be positioned on a rear surface of the door 40 which faces the storage 12. In addition, one or more inner cameras 152 may be positioned on a rear surface of the door 50 which faces the storage 13.

The controller 110 may control a photographed image to be stored in the storage 190 through one of the front camera 151 and the inner camera 152.

The sensor 160 may detect a peripheral state (e.g., illuminance) of the refrigerator 100 and/or an internal state (e.g., temperature of storage chamber) of the refrigerator 100 through one or a plurality of sensors.

The sensor 160 may include a proximity sensor for detecting whether a user approaches to the refrigerator 100 and one or more temperature sensors 162 for detecting a temperature of a storage (e.g., a freezer, a cold room, a vegetable room, and the like) of the refrigerator 100. In addition, the sensor 160 may include an illuminance sensor (not illustrated) which detects an amount of light in the periphery of the refrigerator 100 corresponding to a change of brightness. One of the proximity sensor 161 and the illuminance sensor (not illustrated) from among the sensor 160 may be positioned on a front surface of the door of the refrigerator 100. In addition, the temperature sensor 162 may be positioned indoors to correspond to the storage.

It would be easily understood by those skilled in the art that a sensor type included in the sensor 160 may be added, modified or deleted according to a performance of the refrigerator 100.

A touch screen (or display) may provide a graphical user interface (GUI) corresponding to various services (e.g., data transmission, video call, data transmission, broadcast reception, viewing of a video content, electronic payment including mobile payment, or the like). In an example embodiment, a touch screen may be a concept which includes a display.

The touch screen 170 may include a touch panel 172 which receives a user input (e.g., touch) and a display panel 171 for displaying a screen. In the touch screen 170, the display panel 171 and the touch panel 172 may be implemented as integral-type (e.g., in-cell type touch screen or on-cell type touch screen).

The touch screen 170 may include an edge touch panel (not illustrated) which receives a user input and an edge display panel (not illustrated) for displaying a screen. The edge touch panel and the edge display panel may be implemented as integral-type as described above.

The touch screen 170 may transmit an analog signal corresponding to a single touch or multi touch which is input through a home screen (not illustrated) or a GUI to a touch screen controller (not illustrated). The touch screen 170 may receive a single touch or multi-touch through a body (e.g., fingers including a thumb) of the user or an input pen (e.g., stylus, not illustrated).

According to an example embodiment, a touch screen (or a display, 170) may output a visual feedback corresponding to an indication of a storage position within a storage of the identified food. In an example embodiment, the display may be a concept which includes the touch screen 170.

A touch screen controller (not illustrated) converts an analog signal corresponding to a touch (single touch or multi-touch) received from the touch screen 170 into a digital signal, and transmits the digital signal to the controller 110. The controller 110 may calculate a position (e.g., x coordinate and y coordinate) of a touch received by the touch screen 170 by using the digital signal received from the touch screen controller (not illustrated).

The controller 110 may control the touch screen 170 by using the digital signal received from the touch screen controller (not illustrated). For example, in response to a touch being input, the controller 110 may display a shortcut icon (or referred to as icon) selected from among shortcut icons corresponding to applications displayed on the touch screen 170 distinctively from other shortcut icons that are not selected, or may execute an application (e.g., a video application) corresponding to the selected shortcut icon and display a video application screen on the touch screen 170.

The audio outputter 175 may output sound corresponding to various signals (e.g., a wireless signal, a broadcast signal, an audio source, a video file or photographing of a photo) decoded by an audio codec under the control of the controller 110. The audio outputter 175 may include one or more speakers.

One or more audio outputters 175 may be positioned on one side and/or lateral side of the refrigerator 100. One or more audio outputters 175 may be positioned to be adjacent to a touch screen (or a display, 170) positioned on a front surface of the refrigerator. In addition, one or more audio outputters 175 may be positioned to be adjacent to the front camera 151 positioned on a front surface of the refrigerator.

According to an example embodiment, the audio outputter 175 may output an auditory feedback corresponding to an indication of a storage position within a storage of the identified food.

The driver 180 may include a compressor 181, a fan 182, a filter 183 or a heater 184 which is operated under the control of the controller 110. The driver 180 may further include a lighting (not illustrated) or a smell removing apparatus (not illustrated).

The compressor 181 compresses a refrigerant which is an operating fluid of a freezing cycle under the control of the controller 110. The freezing cycle includes a condenser (not illustrated) which transforms a gas refrigerant compressed by the compressor 181 into a liquid refrigerant, an expander (not illustrated) which reduces a pressure in the liquid refrigerant, and an evaporator (not illustrated) which gasifies the pressure-reduced liquid refrigerant. The controller 110 may control a temperature in the storage through gasification of a liquid refrigerant. In addition, the refrigerator 100 may control a temperature of a storage through a peltier element (not illustrated) using a peltier effect, a magnetic cooling apparatus (not illustrated) using a magnetocaloric effect.

The fan 182 may circulate an outside air under the control of the controller 110. An air which is heated by a cooling cycle may be cooled from heat exchange through an outside air.

The filter 183 may include an air purifier. The filter 183 may be floated within the storage under the control of the controller 110 or may sterilize (or remove) the attached virus. The filter 183 may include an icon sterilization purifier.

The heater 184 removes frost which occurs under the control of the controller 110. The heater 184 may include a defrost heater.

The storage 190 may store a signal or data (e.g., corresponding to food management (or food recognition) that is inputted or outputted to correspond to an operation of elements 110 to 195 under the control of the controller 110. The storage 190 may store a control program for controlling the refrigerator 100 or the controller 110 and a graphical user interface (GUI) relating to an application (e.g., a food management application, a food recognition application, or the like) provided from the manufacturer and downloaded from an outside source, an image corresponding to the GUI, user information, a document, databases or relevant data.

The storage 190 may store an image (or video) of food photographed in the camera 150. A food image 304 may be a concept which includes a binary file including one or more images displayed on the touch screen 170 and one or more images stored in the storage 190. In addition, the storage 190 may store various types of comparison food images corresponding to a comparison of the photographed food images (or videos). The various types of comparison food images may include many (e.g., tens of or hundreds of) food images for each type of food. In a case in which the photographed food image (or video) is a carrot, the comparison food image may be the comparison food image may include images of a carrot, such as various shapes, sizes, colors, and wash states of a carrot and whether the carrot is packed or not.

The storage 190 may store various training data corresponding to food recognition to recognize (or distinguish) a photographed food image. For example, an image of a carrot including various shapes, sizes, colors or wash states of the carrot and whether the carrot is packed or not may be stored in the storage 190 as training data to recognize a carrot. In addition to fruit, the training data corresponding to food that is edible, drinkable or cookable by a user, such as vegetables, meat, seafood and the like may be stored in the storage 190. In addition, the storage 190 may store a learning model to recognize a photographed food image.

The storage 190 may store an image (or video) of food photographed by the camera 150 and store a food recognition application (or an additional application using a food recognition algorithm) which distinguishes food to be identified from the photographed food image through machine learning. All of a food recognition application may be stored in the storage. Some of a food recognition application may be stored in an external apparatus (e.g., a server or a portable device). Some of a food recognition application may be stored in the storage 190. In addition, some of the training data corresponding to food recognition may be stored in the storage 190. Alternatively, some of the training data corresponding to food recognition may be stored in an external apparatus (e.g., a server or a portable device).

The controller 110 may recognize (or distinguish) food from an image of food photographed in the camera 150 by using a food recognition application.

The storage 190 may store a visual feedback (e.g., a video source and the like) which is outputted to correspond to an indication of a storage position within a storage of the identified food and is recognizable by a user and an auditory feedback (e.g., sound source and the like) which is outputted from the audio outputter 175 and is recognizable by a user.

The storage 190 may store a feedback providing time (e.g., 500 ms) of feedback provided to a user.

In an example embodiment, the term "storage" includes a storage 190, ROM 112 within the controller 110, and a memory card (e.g., a micro SD card and the like, not illustrated) which is mountable to RAM 113 or a slot (not illustrated) of the refrigerator 100. The storage 190 may include a non-volatile memory, a volatile memory, a hard disk drive (HDD) or a solid state drive (SSD).

The power supply 195 may supply power to elements 110 to 195 of the refrigerator 100 under the control of the controller 110. The power supply 195 may supply power inputted from an external power source to each element of the refrigerator 100 via a power code (not illustrated) under the control of the controller 110.

It would be easily understood by those skilled in the art that at least one element of the refrigerator 100 illustrated in FIGS. 1A, 1B and 2 can be added, deleted or modified in response to performance of the refrigerator 100.

Figure 3:
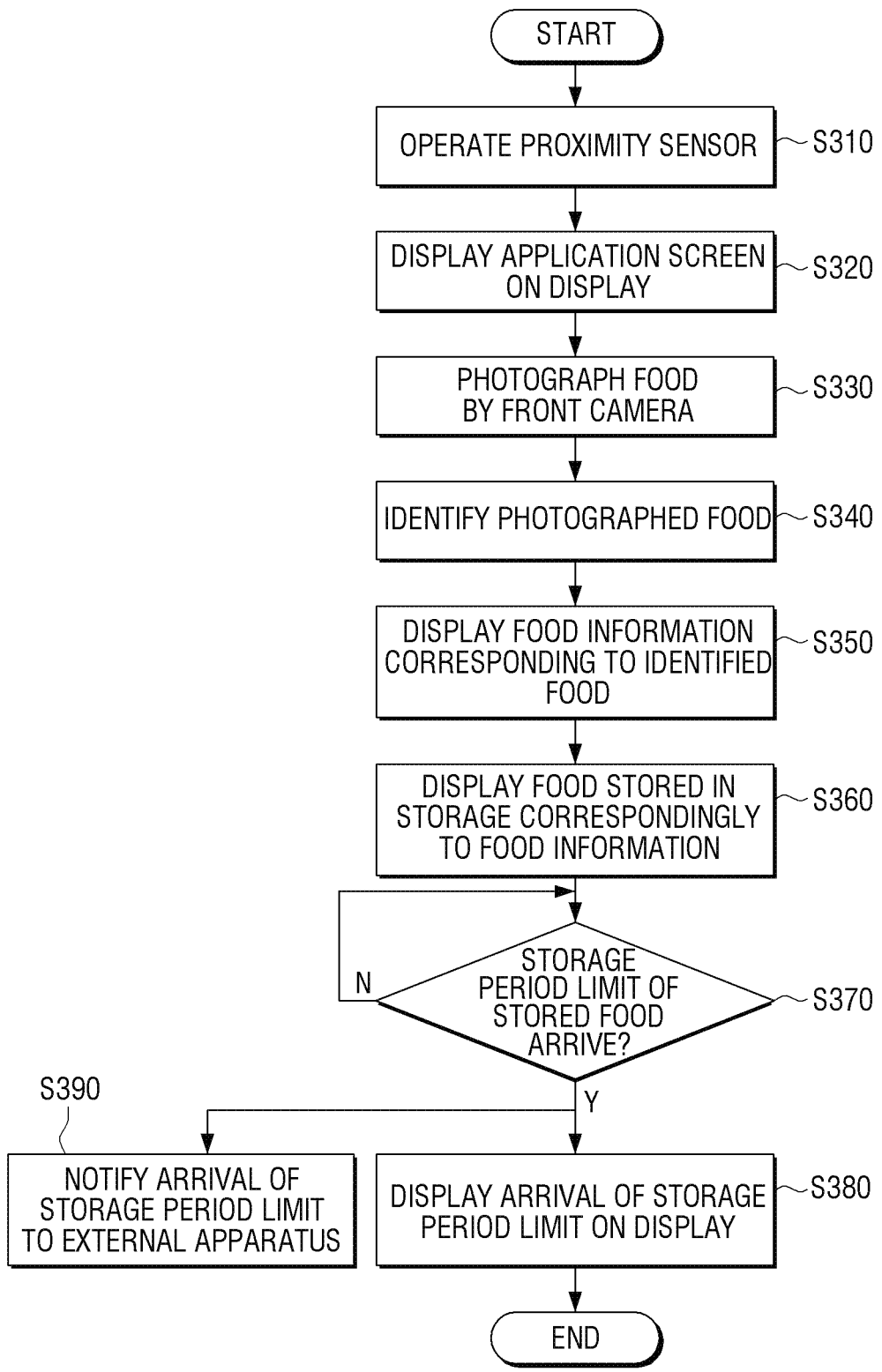
FIG. 3 illustrates a flowchart of a food management method of a refrigerator having a front camera and a display, according to an embodiment of the present disclosure.

FIG. 3 illustrates a flowchart of a food management method of a refrigerator having a front camera and a display, according to an embodiment of the present disclosure.

FIGS. 4A to 4F illustrate diagrams of an example food management method of a refrigerator having a front camera and a display, according to embodiments of the present disclosure.

At step S310 of FIG. 3, a user approach is detected.

Figure 4A:
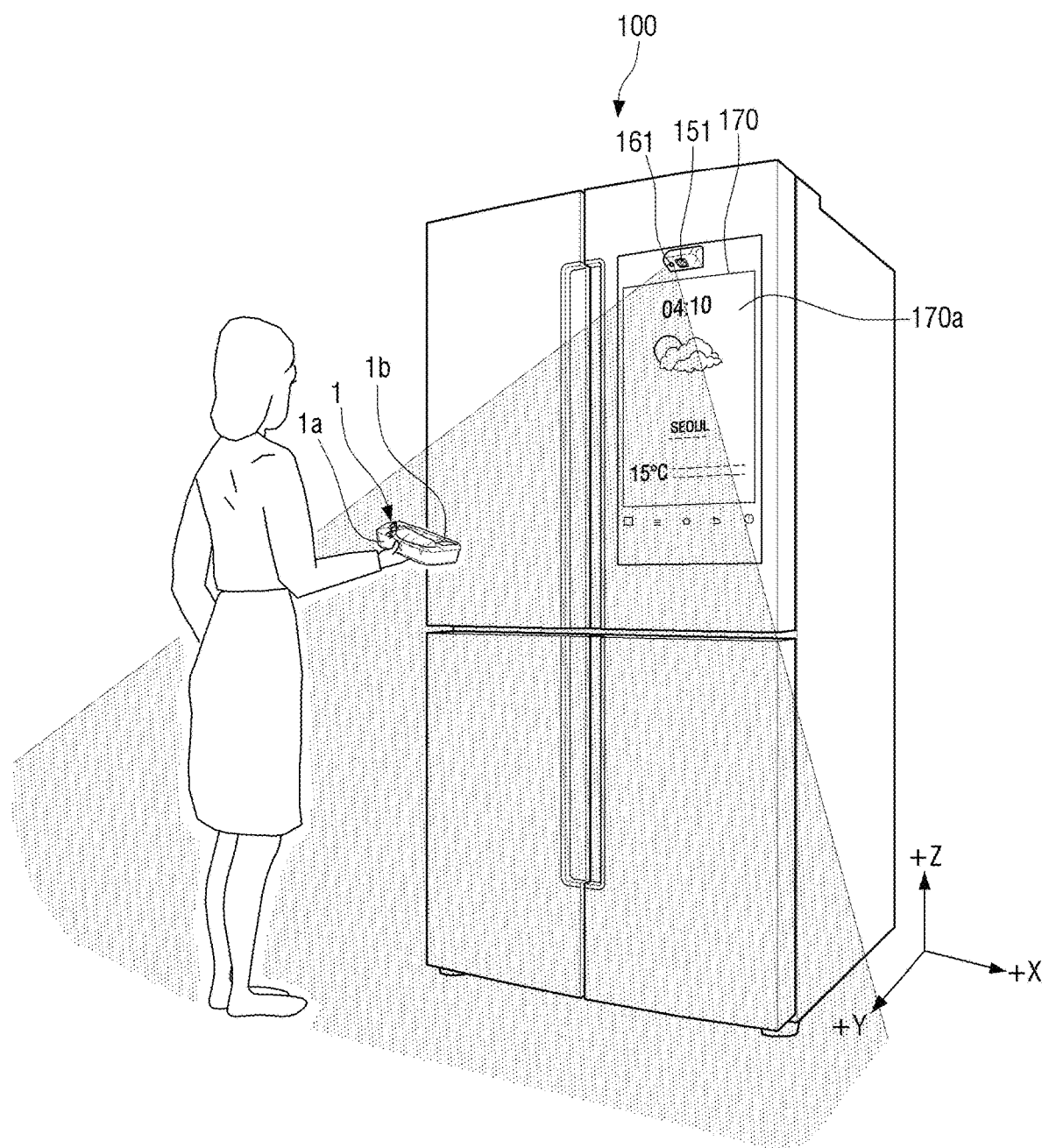
FIGS. 4A to 4I illustrate diagrams of an example food management method of a refrigerator having a front camera and a display, according to embodiments of the present disclosure.

Referring to FIG. 4A, a user holding a food 1 is positioned on a front side of the refrigerator 100. The food 1 may include a packed state or an unpacked state. With regard to the food in a packed state, the packed food may include a container 1a accommodating the food 1 and a packing material 1b packing food accommodated in the container. Additional information of food (e.g., a trademark (not illustrated), a price (not illustrated) or a barcode (not illustrated)) may be positioned on a surface of the packing material 1b. The above-described additional information of food may be recognized as well in the process of recognizing the food through the front camera 151.

One content (e.g., a weather widget or a time widget) from among various contents may be displayed on the touch screen 170 positioned on a front surface of the door of the refrigerator 100.

The refrigerator 100 may include a user approach detector for detecting a user positioned on a front side. The user approach detector may include one of a microphone 140 positioned on a front surface of the door, a front camera 151 inclined at a set angle, and a proximity sensor 161. In addition, the user approach detector may include a combination of the microphone 140 at a front surface of the door, the front camera 151 inclined at a set angle, and a proximity sensor 161.

The controller 110 of the refrigerator 100 may detect an approaching of the user to the refrigerator by using the user approach detector. The microphone 140 may receive a user voice that is uttered. The controller 110 may distinguish (or authenticate) the user by recognizing the user voice.

The front camera 151 inclined at a set angle may photograph an appearance (or a user motion or a user presence) of the user on a front side of the refrigerator. The controller 110 may distinguish (or authenticate) the user by recognizing a photographed image (e.g., face). The proximity sensor 161 may detect an approaching of the user from the front side of the refrigerator 100.

The user approach detector may detect a user approach through one sensor or may detect a user approach through a plurality of sensors. In addition, the user approach detector may distinguish (e.g., through a microphone or a camera) the user approaching the refrigerator through one sensor, or may distinguish (e.g., through a combination of the proximity sensor and a camera, a combination of the proximity sensor and a microphone, and the like) the user approaching through a combination of a plurality of sensors.

The user approach detector may output an electrical signal corresponding to detection of a user approach to the controller 110. In addition, the user approach detector may output an electrical signal corresponding to detection of a user approach to the storage 190.

At step S320 of FIG. 3, a screen of a food management application is displayed on a display.

Figure 4B:
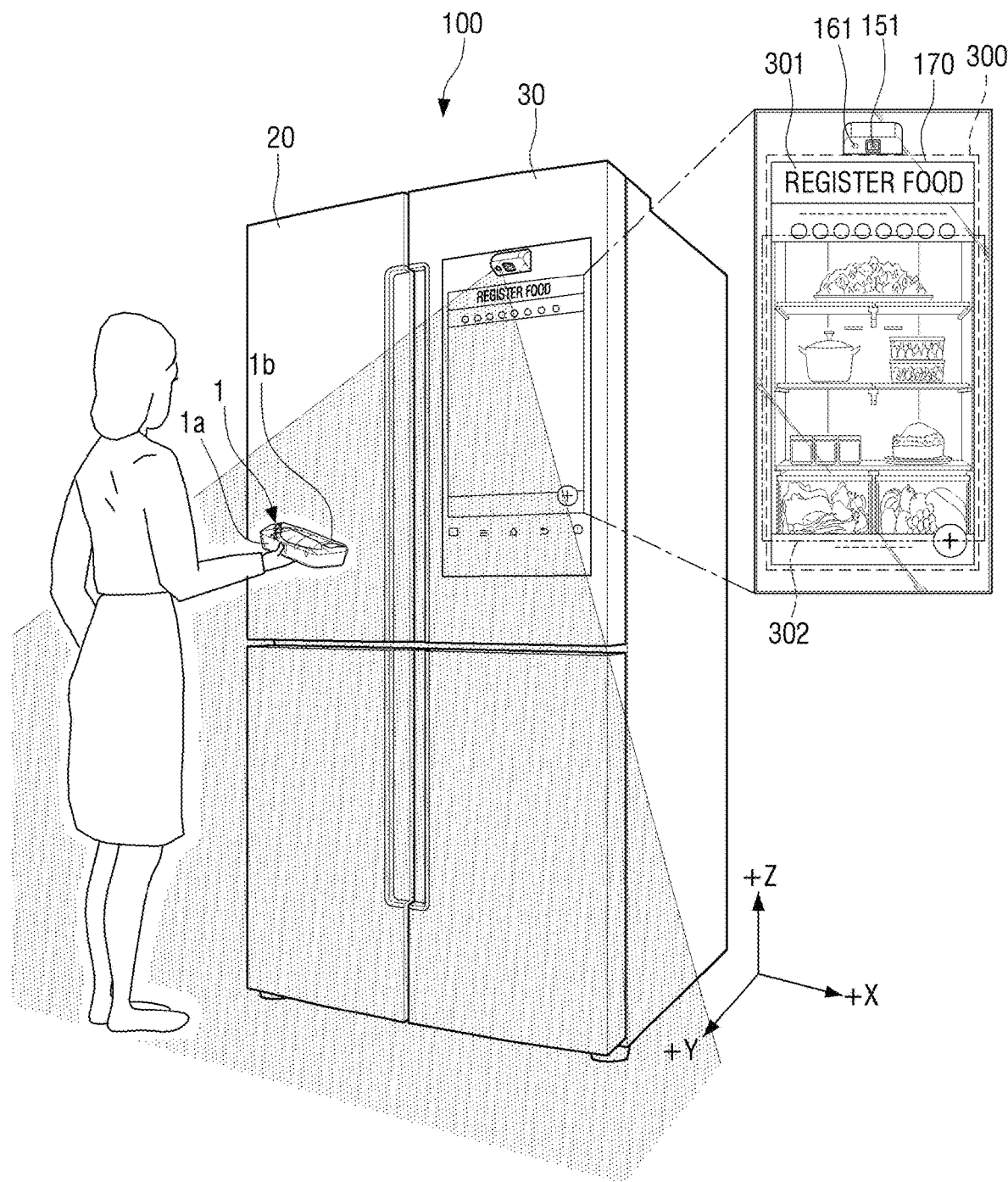

Referring to FIG. 4B, the controller 110 may display a screen of a food management application on the touch screen 170 in response to detection of a user approach. The controller 110 may change (e.g., from a widget screen 170a to a food management application screen 300) a displayed content in response to detection of a user approach.

The controller 110 may display a screen of a food management application in which food may be registered in response to detection of a user approach. The screen of the food management application screen 300 may include a title area 301 and a display area 305 of food stored in a storage (e.g., a cold room). In FIG. 4B, the "Register food 301a" is displayed on the title area 301. An image displayed on the food management area 302 may be photographed by an inner camera 152.

The user may touch the Register food 301a of the title area 301 to photograph food (e.g., a carrot, 1) held by the user, which is an object to be photographed, through the front camera 151 inclined at a set angle.

At step S330 of FIG. 3, food is photographed in the front camera.

Figure 4C:
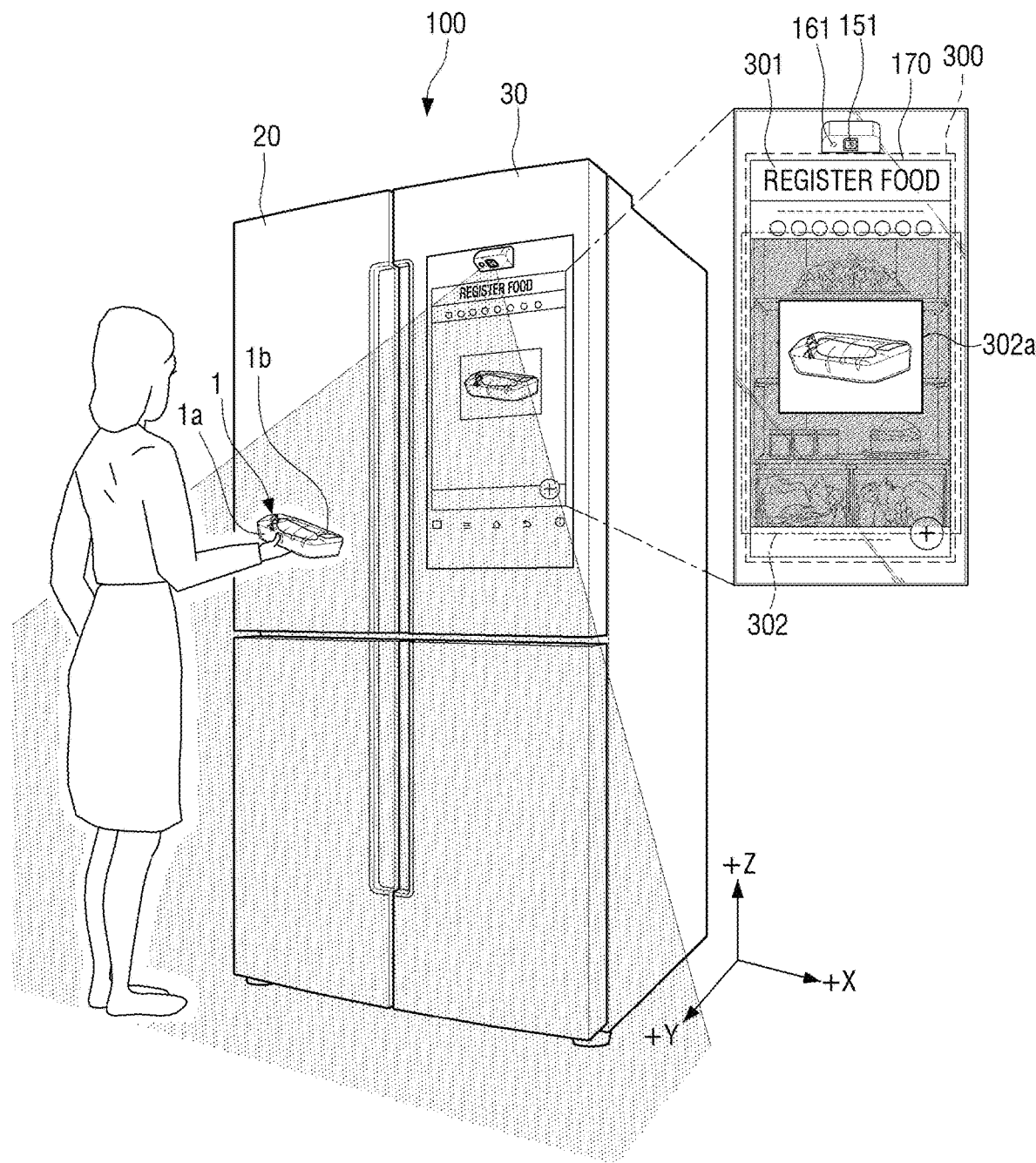

Referring to FIG. 4C, the controller 110 may move the front camera 151 inclined at a set angle, perform a preview (e.g., a video and a preview, 302a) corresponding to the food 1 to be photographed, and display the same on the touch screen 170 in response to the user touching the food and the like 301a. The preview 302a may be displayed on a partial area (e.g., more than 10% and less than 75% of the display area) of the touch screen 170 or may be displayed on the entire area of the touch screen 170. The user may identify a position (e.g., three-dimensional position) appropriate for the front camera 151 to photograph food through the preview 302a.

In a case in which the preview 302a is displayed on the touch screen 170 and a user input is not inputted for a preset time (e.g., one second, modifiable), the controller 110 may continuously photograph the food 1 by using the front camera 151.

Figure 4D:
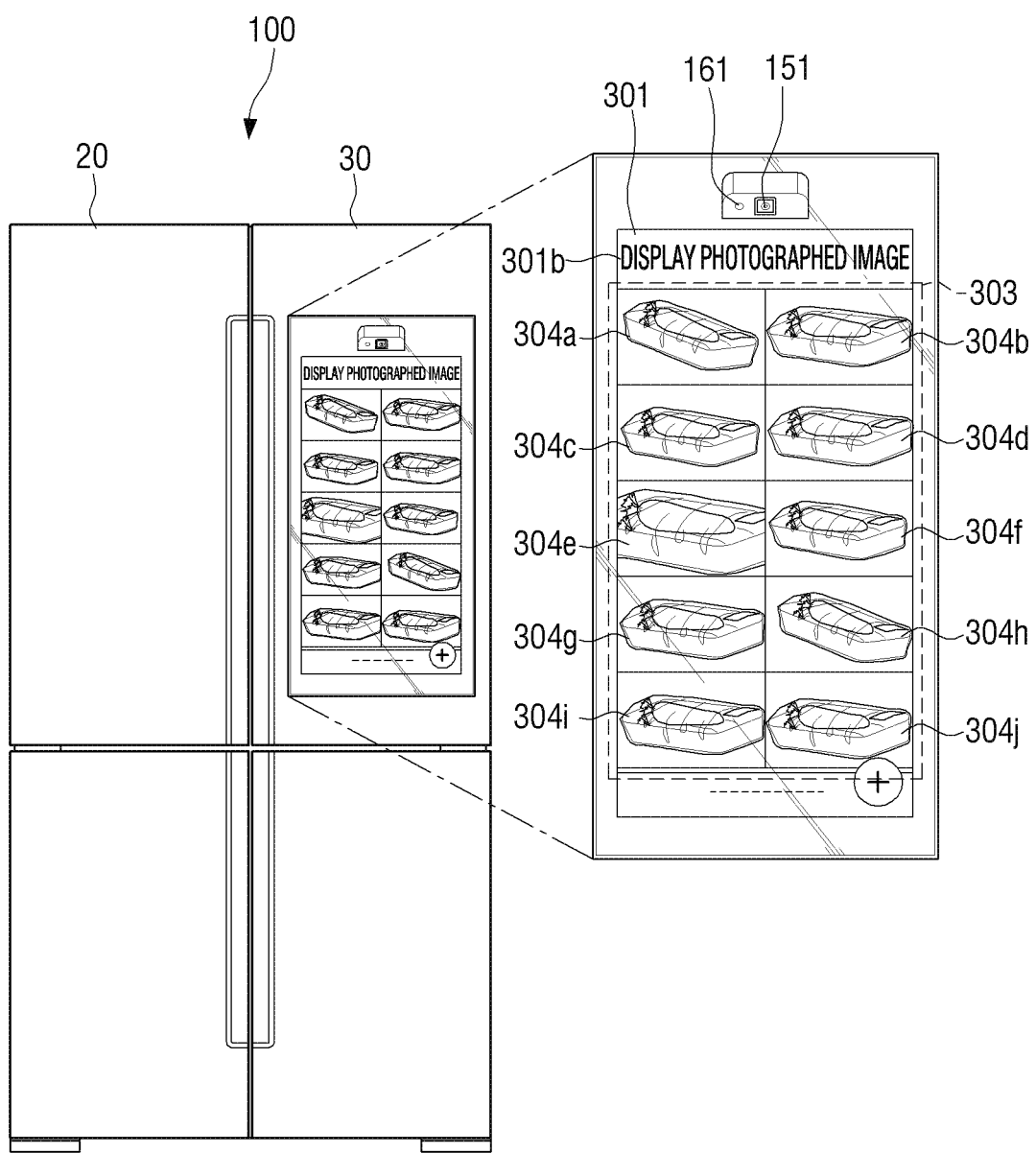

Referring to FIG. 4D, the controller 110 may operate the front camera 151 in response to a user touch of the Register food 301a. The front camera 151 may continuously photograph (e.g., several (or tens of) photos per second or several (tens of) photos at intervals of 0.5 second, the time interval may be modified) a food 1 to be photographed under the control of the controller 110.

The touch screen 170 may display a title area (display photographed image 301a', 301) and 'photographed image displayed area 303' under the control of the controller 110. The touch screen 170 may display a plurality of photographed food images 304, 304a to 304j on the photographed image display area 303 under the control of the controller 110. The number of the displayed food images 304 is only an example, and may be modified according to a type and/or size of food.

The photographed food image 304 may be stored in the storage 190 under the control of the controller 110.

At step S340 of FIG. 3, a photographed food is identify.

Figure 4E:
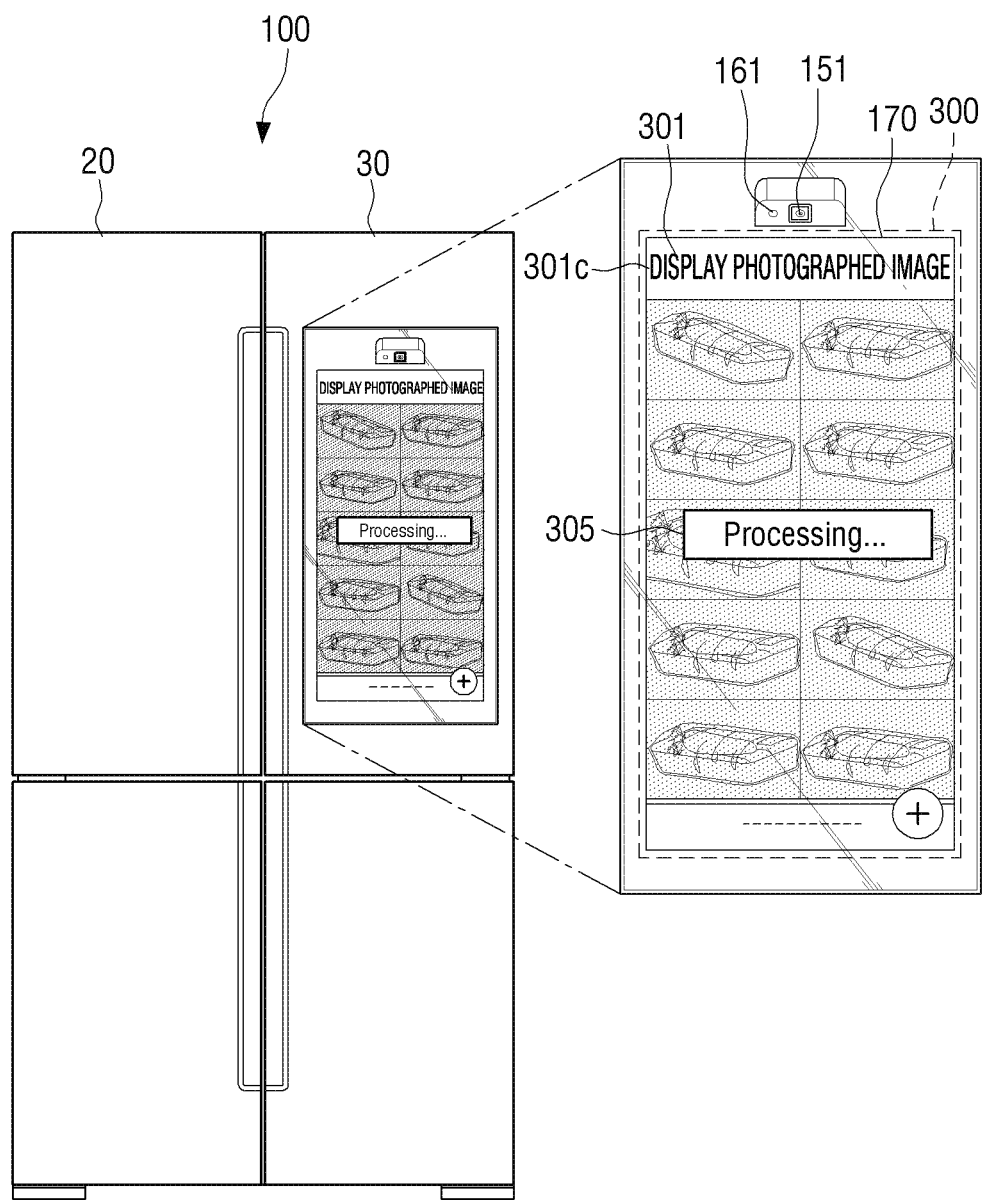
Figure 4F:
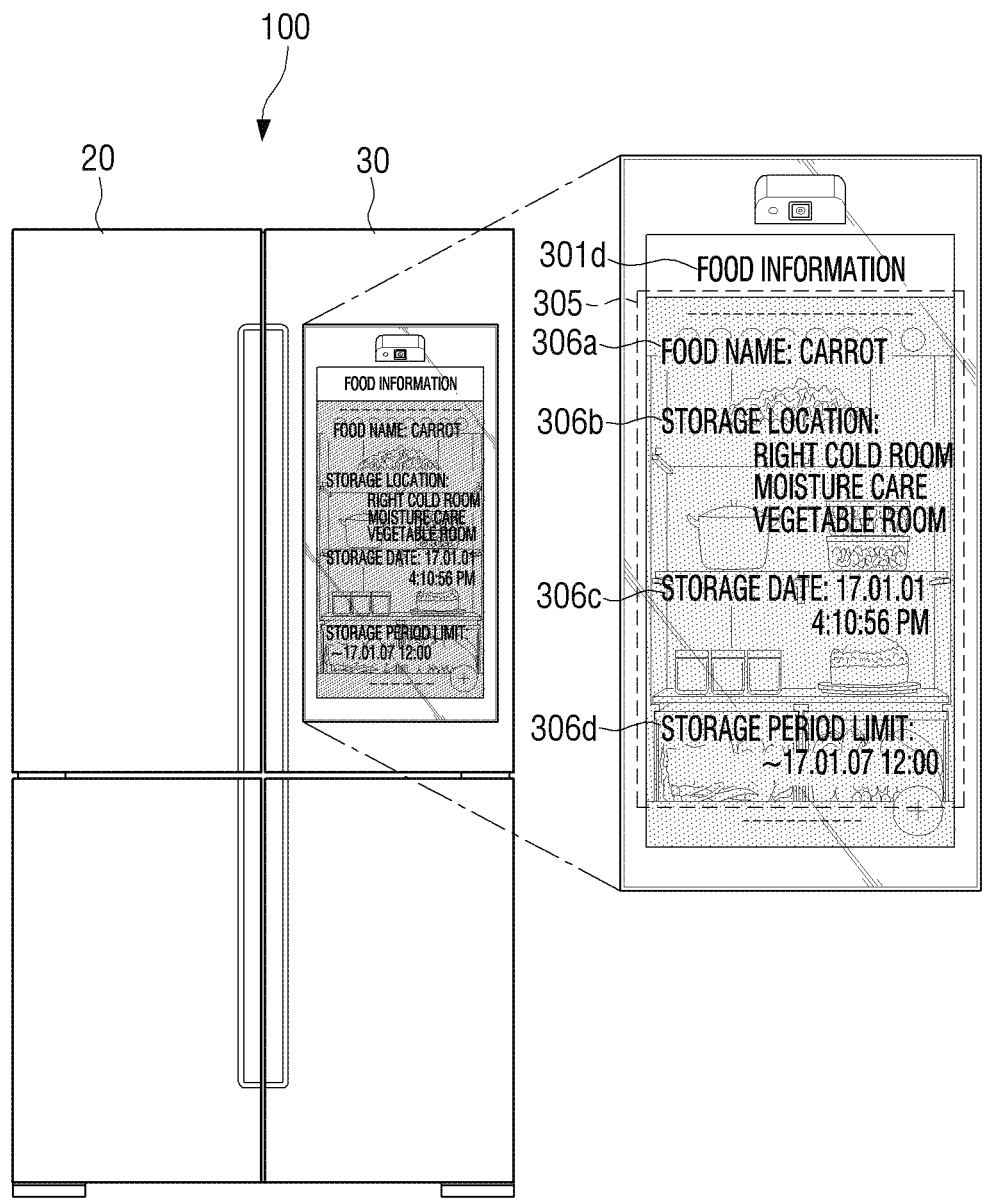

Referring to FIGS. 4E and 4F, the controller 110 may recognize food (or food name, 1) through the photographed food image 304. The controller 110 may recognize the photographed food image 304 and identify food (or food name, 1). The controller 110 may recognize the photographed food image 304 through machine learning and identify food (or food name, 1). The controller 110 recognize the photographed food image 304 through deep learning using a neural network model and identify food (or food name, 1).

The controller 110 may recognize the food image 304 through a food recognition application (or a food management application, not illustrated) being executed and identify a name (e.g., a carrot, an apple and the like) of the food 1. The controller 110 may identify a name of the food 1 by recognizing an image of food through a food recognition application (or a food management application) executed in response to a photographing of the food 1 of the front camera 151 inclined at a set angle.

The controller 110 may display "processing" on the touch screen 170 in response to a food recognition process of the food recognition application.

The food recognition application may identify food (or a name of food, 1) by using a learning model generated through learning of a training data and the food image 304. The training data may include a supervised learning data and an unsupervised learning data. The machine learning using the supervised learning data may execute machine learning by using a food name (e.g., "carrot") corresponding to the supervised learning data and a food image (e.g., images of carrots of various sizes and numbers). The machine learning using the unsupervised learning data may execute machine learning by using a food image (e.g., images of carrots of various sizes and numbers).

The food recognition application may find a rule or a pattern from a stored training data. The food recognition application may find a rule or a pattern from the training data through a learner. A learning model may be generated through a rule or pattern found by the learner. The food recognition application may identify food through a generated learning model and the food image 304.

The learning data described above may be stored in an external server 210 which is connected to the storage 190 and the refrigerator 100 via a communication interface. The learning data described above may be regularly updated to the storage 190 and stored in (or updated to) an external server 210 connected to the refrigerator 100 via a communication interface. A storage (not illustrated) of a server 210 storing a training data may include a storage of a server (not illustrated) of a manufacturer of the refrigerator 100, a storage of a server (not illustrated) which is capable of downloading a food recognition application, and a storage of an application server (not illustrated) which is capable of downloading an application executable in the refrigerator.

For machine learning, the food recognition application may preferentially primarily use (or learn) a training data stored in the storage 190 of the refrigerator 100 and then, secondly use (or learn) a training data stored in the storage (not illustrated) of the server 210. The training data which is used for food recognition of a learning model may be first used in the storage 190 of the refrigerator 100 and then, may be secondly used in the storage (not illustrated) of the server 210. The training data of the storage 190 described above may be periodically updated. In addition, the training data stored in the storage of the server 210 may be periodically updated.

In a case in which the food 1 is not identified through first image recognition using the storage 190 in the food recognition application, the controller 110 may proceed with a second image recognition by using the training data stored in the storage of the server 210 via the communication interface 120. In addition, in a case in which the food 1 is not identified through first image recognition using the storage 190 in the food recognition application, the controller 110 may execute a second image recognition by using search history or frequently-searched images of the user (or the refrigerator 100) stored in the storage of the server 210 via the communication interface 120.

In a case in which the food 1 is not identified through a second image recognition of the communication interface 120 and the storage of the server 210 in the food recognition application, the controller 110 may search the storage (not illustrated) of the server (not illustrated) of a store (or a mart) that sold the food via the communication interface 120 and execute a third image recognition.

In a case in which the food 1 is not identified through a third image recognition using the communication interface 120 and the storage (not illustrated) of the server (not illustrated) of a mart (or a store) in the food recognition application, the controller 110 may execute a fourth image recognition through performing search through the communication interface 120 and a search engine.

The food recognition search order described above (e.g., first, a storage 190, a storage of a server 210, a storage (not illustrated) of a server (not illustrated) of a mart (or a store) and last, a search engine, which may be called a "food recognition search order") may be changed (e.g., an attempt may be made in a search engine after an attempt is made in the storage 190) by the controller 110.

The controller 110 may identify the food 1 according to a food recognition application and a food recognition search order. In a case in which a food recognition is identified, the controller 110 may not display a displayed "processing" 305 on the touch screen 170.

The storage 190 may store the identified food (or a food name) under the control of the controller 110.

Figure 6:
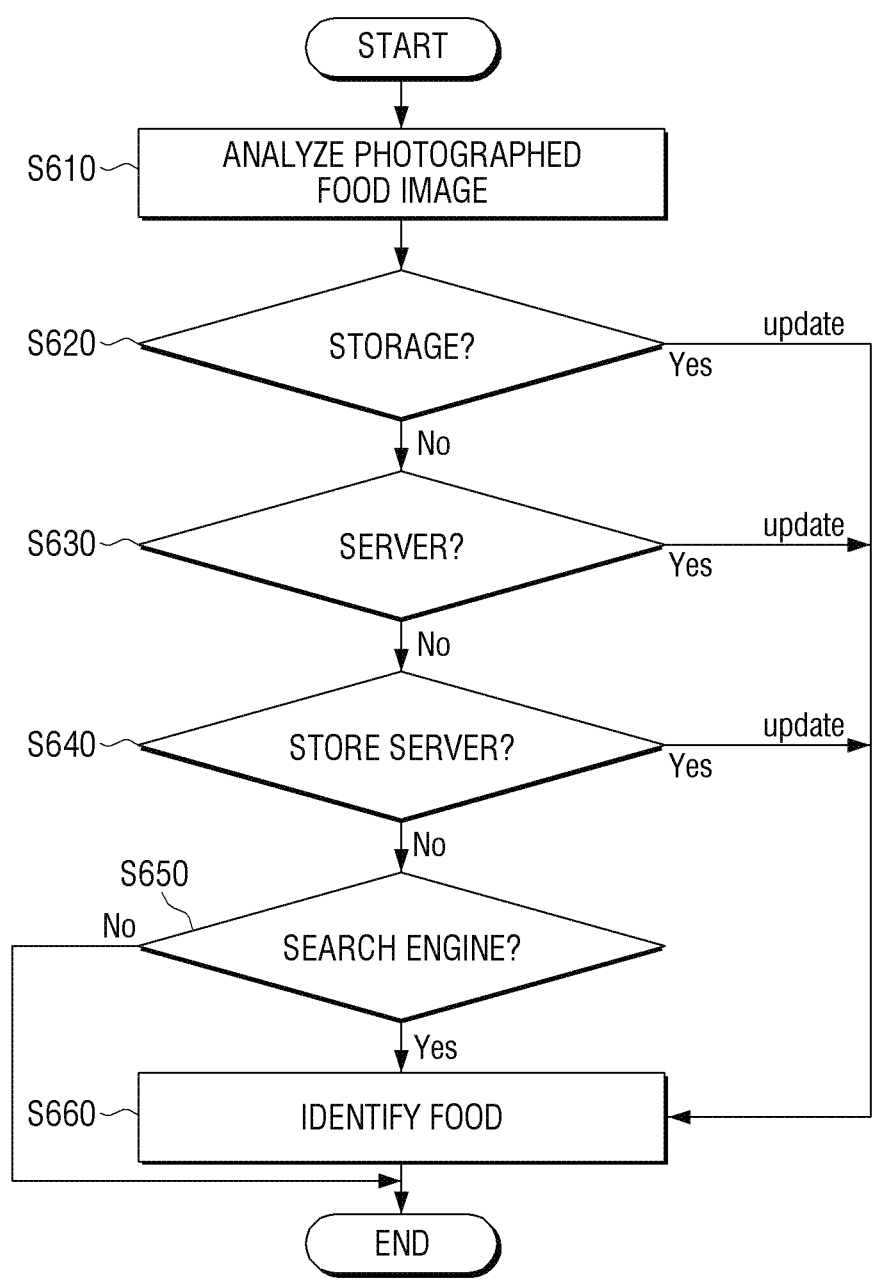
FIG. 6 illustrates a flowchart of a food management method of a refrigerator having a front camera and a display, according to an embodiment of the present disclosure.

FIG. 6 illustrates a flowchart of a food management method of a refrigerator having a front camera and a display, according to an embodiment of the present disclosure.

Referring to FIG. 6, a food recognition application according to another example embodiment may analyze (or identify) food (or a food name, 1) by using a feature (or a feature point and image feature) of the food image 304, at operation S610 of FIG. 6. The feature of an image may include a feature point of the image and/or an amount of feature of the image. The feature amount of the image may be an area in which a luminance value between consecutive pixels in the image is greater than a set value (e.g., 100, modifiable). The feature amount of the image is a value indicating a feature value of the image in a vector value.

The food recognition application may compare a feature point of the image by using the feature amount of the image. The controller 110 may compare (e.g., similarity between feature points of a plurality of images) the feature points of the images by using the feature amount of the image calculated through the food recognition application. Various methods of extracting a feature point of an image and a method of calculating a feature amount of an image are described above and thus, the detailed description thereof will be omitted.

The food recognition application may compare the feature amount of the image corresponding to the food image 304 with the feature amount of the image corresponding to a comparison food image pre-stored in the storage 190.

The pre-stored comparison food image may be stored in the storage 190 and an external server 210 connected to the refrigerator 100 via a communication interface. A storage (not illustrated) of a server 210 storing a pre-stored comparison food image may include a storage of a server (not illustrated) of a manufacturer of the refrigerator 100, a storage of a server (not illustrated) which is capable of downloading a food recognition application, and a storage of an application server (not illustrated) which is capable of downloading an application executable in the refrigerator.

A pre-stored comparison food image for food recognition of a food recognition application may perform a first comparison (operation S620 of FIG. 6) prior to comparing the storage 190 of the refrigerator 100 and then, perform a second comparison (operation S630 of FIG. 6) of the storage of the server 210. The pre-stored comparison food image of the storage 190 described above may be periodically (e.g., time, day, week, month and the like, modifiable) updated. A comparison food image pre-stored in the storage of the server 210 may be periodically (e.g., time, day, week, month and the like, modifiable) updated as well.

In a case in which the food 1 is not identified through first image recognition using a comparison food image pre-stored in the storage 190 in the food recognition application, the controller 110 may proceed with a second image recognition by using the comparison food image pre-stored in the storage of the server stored in the storage of the server 210 via the communication interface 120. In addition, in a case in which the food 1 is not identified through first image recognition using a comparison food image pre-stored in the storage 190 in the food recognition application, the controller 110 may execute a second image recognition by using search history or frequently-searched images of the user (or the refrigerator 100) stored in the storage of the server 210 via the communication interface 120.

In a case in which the food 1 is not identified through a second image recognition of the communication interface 120 and the storage of the server 210 in the food recognition application, the controller 110 may search (operation S640 of FIG. 6) for a comparison food image pre-stored in the storage (not illustrated) of the server (not illustrated) of a mart (or a store) that sold the food via the communication interface 120 and execute a third image recognition.

In a case in which the food 1 is not identified through a third image recognition using the communication interface 120 and the storage (not illustrated) of the server (not illustrated) of a mart (or a store) in the food recognition application, the controller 110 may execute a fourth image recognition through performing search (operation S650 of FIG. 6) through the communication interface 120 and a search engine.

The food recognition search order described above (e.g., first, a storage 190, a storage of a server 210, a storage (not illustrated) of a server (not illustrated) of a mart (or a store) and last, a search engine (or a web search engine), which may be called a "food recognition search order") may be changed (e.g., an attempt may be made in a search engine after an attempt is made in the storage 190) by the controller 110. A storage of the server 210 described above and a storage (not illustrated) of a server (not illustrated) of a store (or a mart, a department store, an online shopping mall and the like) may be called an external storage.

The controller 110 may identify the food 1 according to a food recognition application and a food recognition search order, at operation S660 of FIG. 6. In a case in which food is identified, the controller 110 may not display a displayed "processing" 305 on the touch screen 170.

The storage 190 may store the identified food (or a food name) under the control of the controller 110.

In a case in which the food 1 is not identified, the touch screen 170 may display "food not identified (or 'food name identified')" under the control of the controller 110. In a case in which the food 1 is not identified, the touch screen 170 may display a pop-up (not illustrated) corresponding to the "food not identified" under the control of the controller 110. In addition, a voice and/or sound corresponding to the "food not identified" may be outputted through the audio outputter 175.

At operations S620 to S650 of FIG. 6, in a case in which the food 1 is not identified, a food management method of a refrigerator is ended.

At operation S660 of FIG. 6, in a case in which the food 1 is identified, the operation S350 of FIG. 3 is performed.

At operation S350 of FIG. 3, food information corresponding to the identified food is displayed.

Referring to FIG. 4F, the controller 110 may display the food information 301*d* and display area 305 corresponding to the identified food on a food information display area 305. Items included in the food information 306 may, for example, include a food name (e.g., "carrot", 306*a*), a recommended location at which food is stored (e.g., "moisture care vegetable room in the right cold room", 306*b*), a storage date at which the identified food is stored (e.g., "Jan. 1, 2017, 4:10:56 PM", 306*c*) and a storage period limit of food (e.g., "until Jan. 10, 2017, 12:00 PM", 306*d*).

The controller 110 may add food additional information which is positioned in the packing material 1*b* of the packed food to the food information. The controller 110 may add additional information of food which is positioned at the packing material 1*b* of the packed food to the food information. The food information described above is only an example, and may further include a place of origin, whether discount is applied and/or a user input (e.g., "let's eat" and the like).

In a case in which the number of items included in the food information 306 is greater than the number of items that may be displayed on the touch screen 170, the user may scroll up or down the food information 306 through a user input (e.g., touch, voice, motion and the like).

The storage 190 may store the displayed (displayable) food information under the control of the controller 110.

At operation S360 of FIG. 3, food stored in the storage is displayed in correspondence with the food information.

Figure 4G:
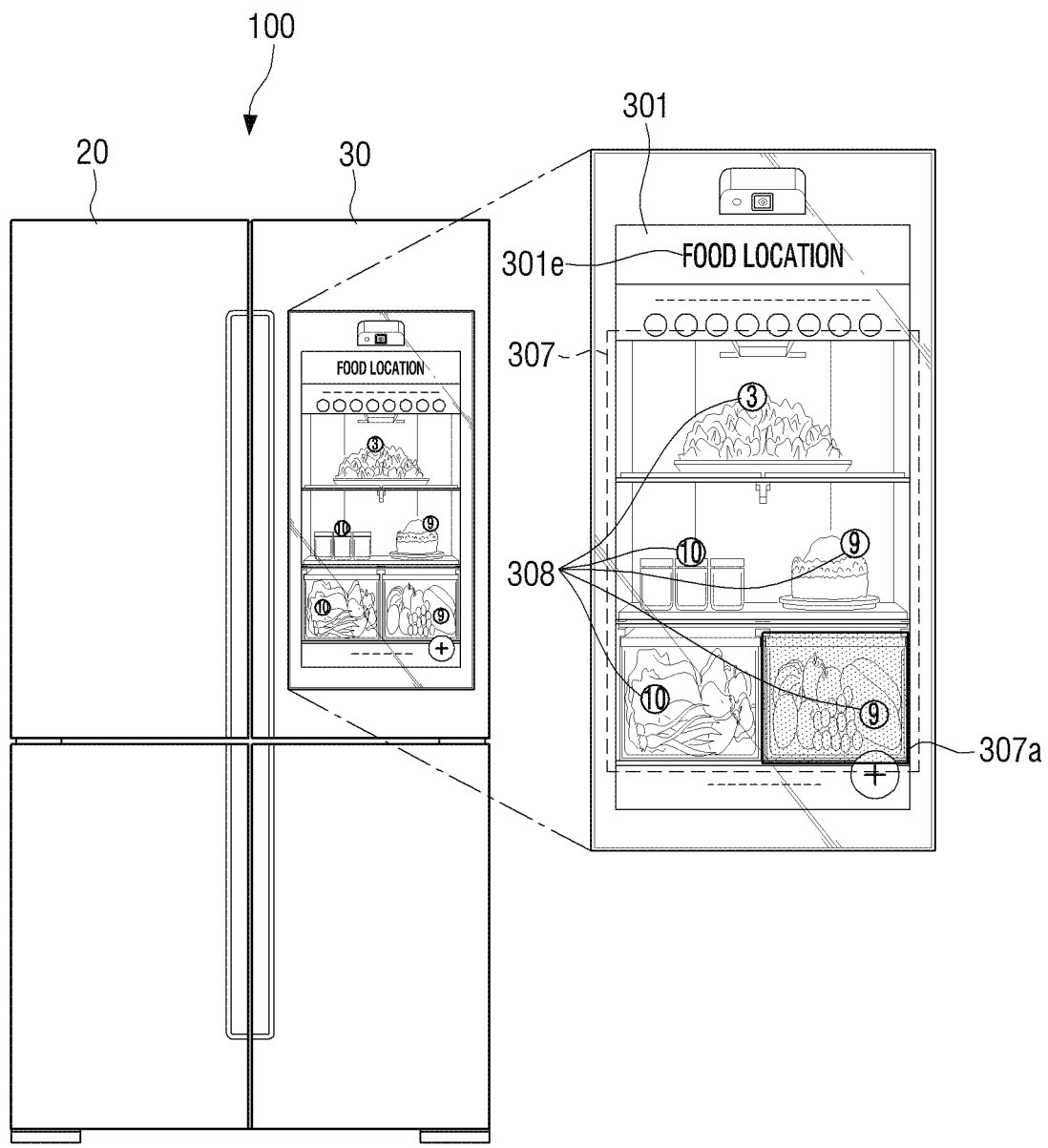

Referring to FIG. 4G, the controller 110 may provide a storage location within the storage of the food according to the food information. The touch screen 170 may display a title area ("food position 301*e*)", 301) and a food storage position 307 under the control of the controller 110.

The food storage position 307 within the storage of the food 1 may be provided to the user through at least one of an auditory feedback which is outputted from the audio outputter 175 and a visual feedback displayed from the touch screen 170. The controller 110 may output the storage location (11*d*2, see FIG. 1B) within the storage of the food 1 as a sound (e.g., "moisture care vegetable room in right cold room (11*d*2)") according to the food information.

The controller 110 may photograph the storage location 11*d*2 within the storage of the food 1 through the inner camera 152 according to the food information and distinguishably display the photographed storage location on the touch screen 170. In addition, the controller 110 may reduce (or briefly illustrate FIG. 1B) the storage location 11*d*2 within the storage of the food 1 according to the food information and distinguishably (adjacent (between the location 306*b* and the storage date 306*c*) to the location 306*b* within the food information 306) display the reduced storage location on the touch screen 170.

Figure 4H:
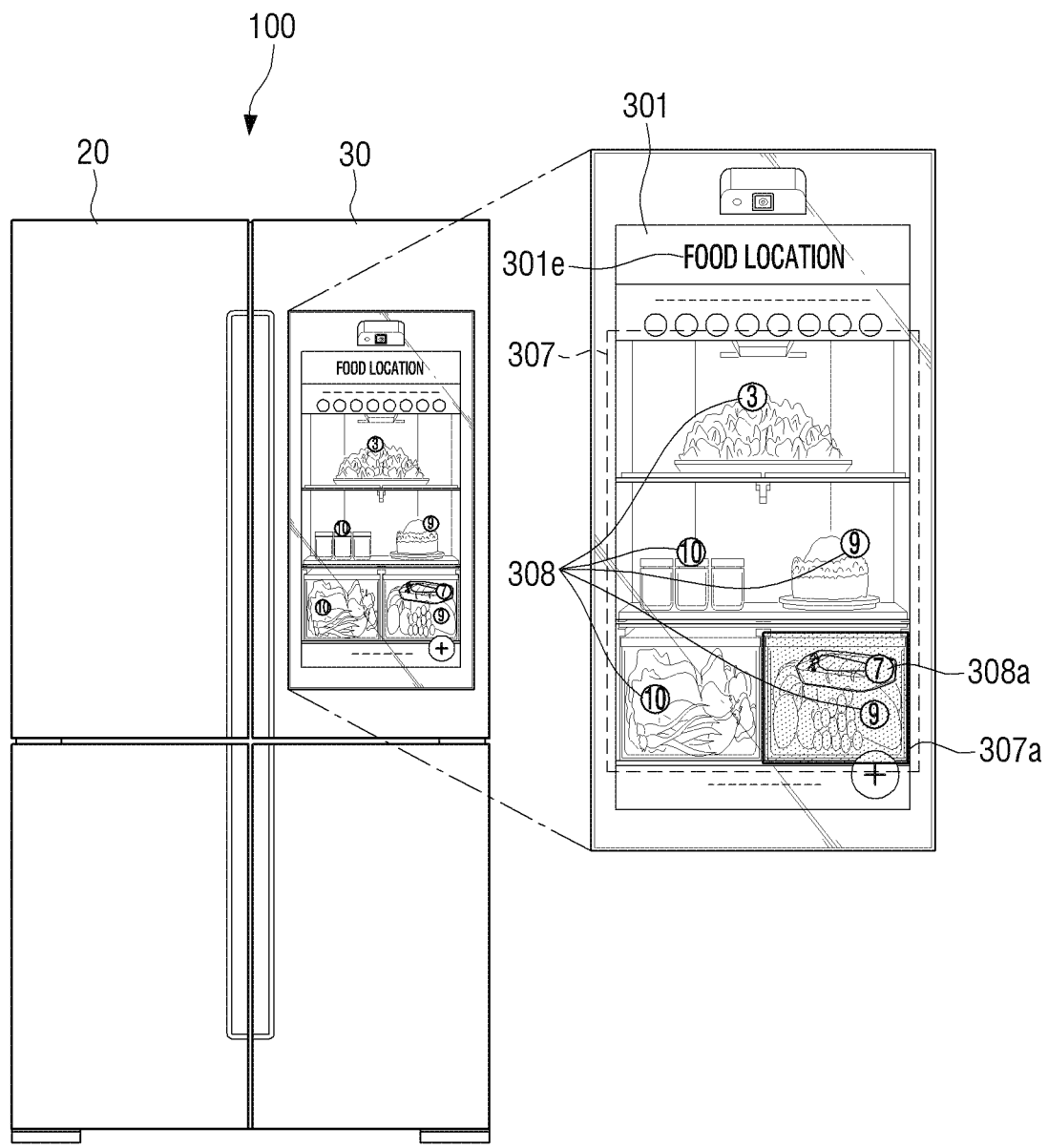

Referring to FIG. 4H, the food 1 stored in the storage is displayed.

The user may control to open the door 30 according to the displayed food information and to accommodate the food 1 in the moisture care vegetable room 11*d*2 in right cold room 11*d*2. The controller 110 may detect opening/closing of the door 30 by using a sensor (not illustrated).

When the door 30 is closing, the touch screen 170 may display the food 1 accommodated in the moisture care vegetable room of right cold room 11*d*2 by a photographing of the inner camera 152 under the control of the controller 110. The food 1 stored in the moisture care vegetable room in right cold room 11*d*2 and the storage period 308 of another food stored in the storage are respectively displayed. In addition, the food 1 stored in the moisture care vegetable room in right cold room 11*d*2 and the storage 308*a* may be displayed together.

The controller 110 may provide a user with feedback corresponding to a storing (or storing and displaying) of the food 1 within the storage according to the food information 306.

The provided additional feedback may be provided in at least one of a visual feedback and an auditory feedback. In addition, the controller 110 may provide the user with a combination of the visual feedback and the auditory feedback.

The visual feedback may include a visual effect (e.g., an additional image or an animation effect like fade in applied to the additional image, not illustrated) corresponding to a storing (or storing and displaying) of the food 1 within the storage according to the food information 306. The controller 110 may display the visual feedback on the touch screen 170.

The auditory feedback may include sound that corresponds to a storing (or storing and displaying) of the food 1 within the storage according to the food information 306. The controller 110 may output auditory feedback via the audio outputter 175. A feedback providing time (e.g., 300 ms) provided to the user may be changed through settings (not illustrated).

At operation S350 of FIG. 3, a storage period limit of the stored food is reached.

The controller 110 may periodically identify the storage period of the food stored in the storage by using the food information. The controller 110 may identify the arrival of the storage period limit of the food 1. The arrival of the storage period limit may be one day (or two days, may be modified according to setting) before the last day of the storage period. The controller 110 may compare the present day (Jan. 6, '17) with the stored food information 306 and identify the arrival of the storage period limit. The controller 110 may identify the arrival of the storage period limit of the food 1 based on the present day and the storage period limit 306*d* of the food information 306.

At operation S370 of FIG. 3, in a case in which the storage period limit of the food 1 has arrived, the operations S380 and S390 of FIG. 3 are performed. In a case in which the storage period limit of the food 1 has not arrived, the process proceeds to a process before the step S370 of FIG. 3.

At operation S380 of FIG. 3, an arrival of the storage period limit is displayed on the display.

Figure 4I:
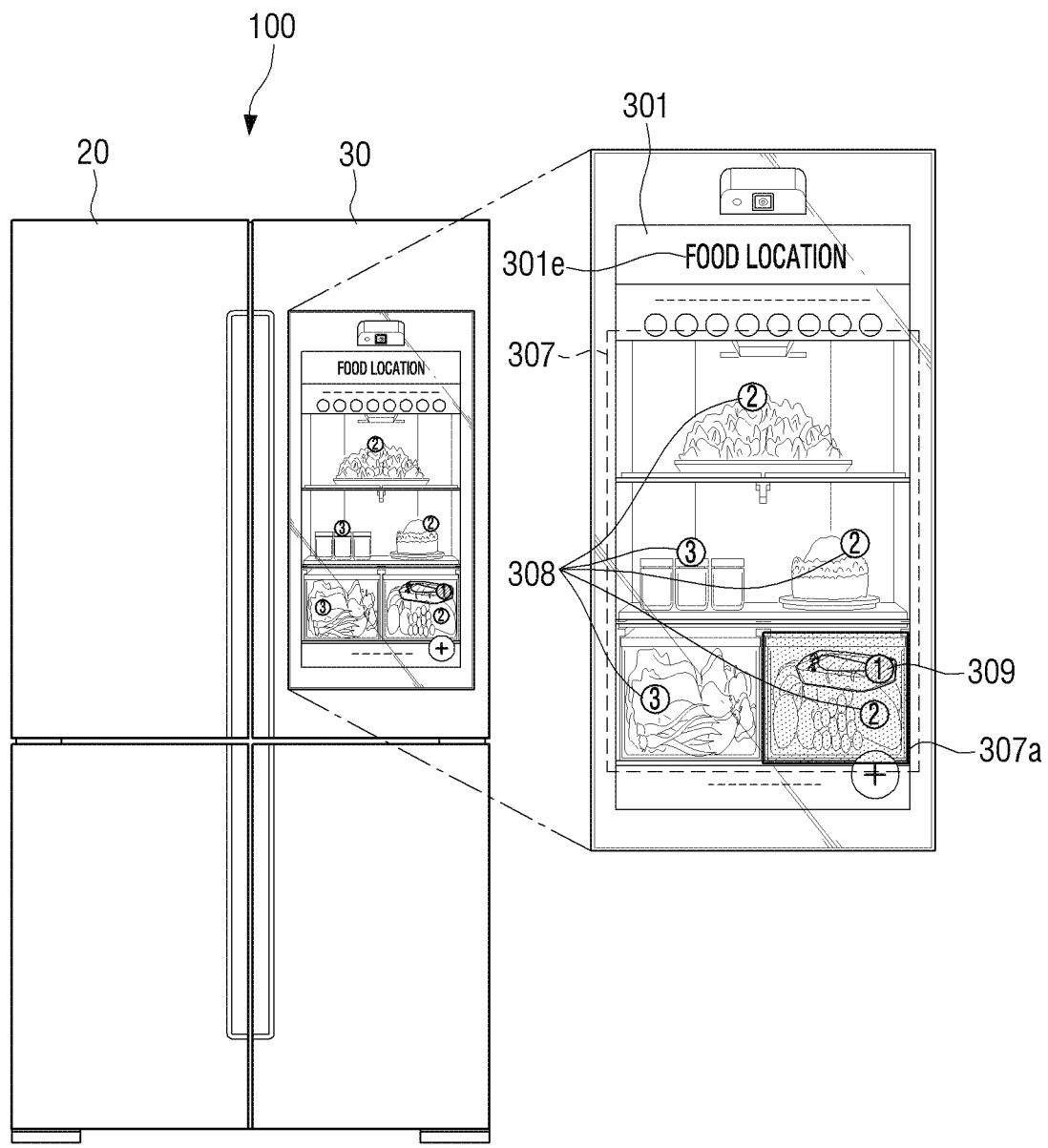

Referring to FIG. 4I, an arrival 309 of storage period limit of the food 1 is displayed on the touch screen 170. The arrival 309 of storage period limit of the food 1 may be displayed as distinguishable from the storage period 308 of another food.

In a case in which the user touches one from among the arrival 309 of storage period limit and the food 1, detailed information 309a (see FIG. 5) corresponding to the arrival of storage period limit of the food 1 may be displayed on the touch screen 170. A pop up (overlay or overlap) of the detailed information 309a may be displayed.

At operation S380 of FIG. 3, in a case in which an arrival of storage period limit is displayed on the display, a food management method of the refrigerator is ended.

At operation S390 of FIG. 3, an arrival of storage period limit is notified to an external apparatus.

Figure 5:
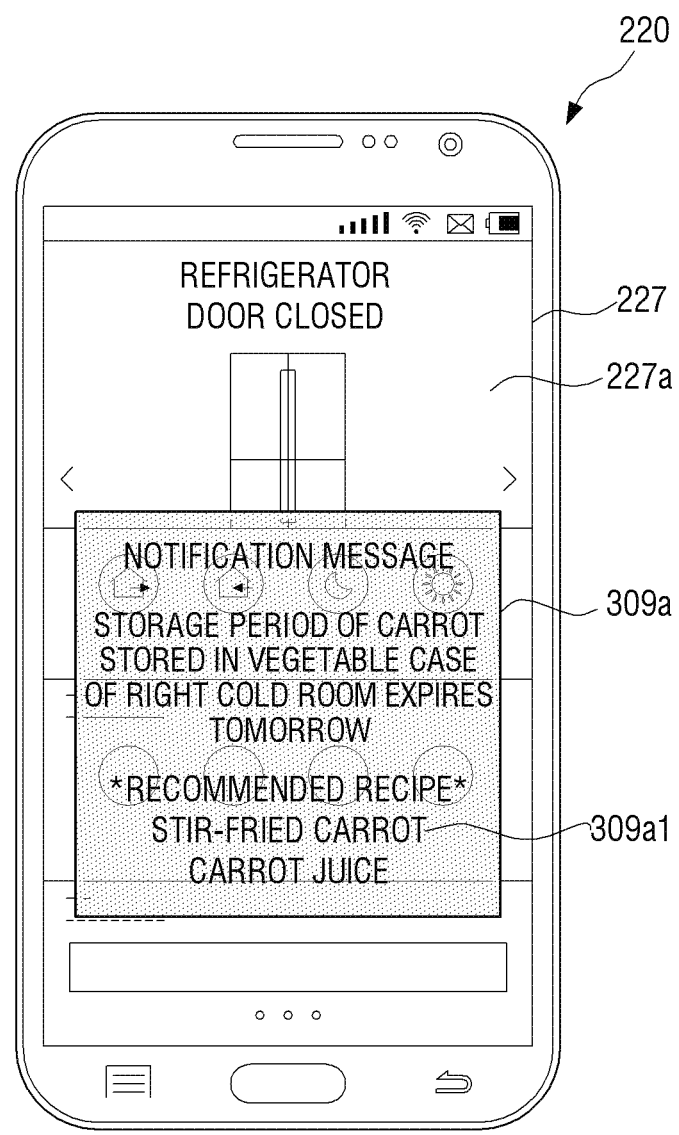
FIG. 5 illustrates a diagram of an example screen of a portable apparatus, according to an embodiment of the present disclosure.

Referring to FIG. 5, a refrigerator management application 227a is displayed on the display 227 of the portable apparatus 220. The portable apparatus 220 managing the refrigerator 100 may functionally connected with the refrigerator 100 via a communication interface (not illustrated). The refrigerator management application 227a executed in the external apparatus 200 managing the refrigerator 100 may functionally connected with the refrigerator 100 via a communication interface (not illustrated).

The external apparatus 200 may receive an arrival of storage period limit of the food 1 from the refrigerator 100 via the communication interface. The portable apparatus 220 may receive a notification message (or detailed information) corresponding to the arrival of storage period limit of the food 1 from the refrigerator 100 via the communication interface.

The portable apparatus 220 may display the received notification message on the display 227. The external apparatus 200 may display a pop-up of (or overlay or overlap) the received notification message over the refrigerator management application displayed on the display 227. The notification message 309a may include a recommended recipe 309a1 of the food 1 of which the storage period limit has arrived.

At operation S390 of FIG. 3, in a case in which the arrival of storage period limit is notified to an external apparatus. The food management method of the refrigerator is ended.

The methods according to exemplary embodiments of the present disclosure may be implemented as a program instruction type that may be performed through various computer units and may be recorded in a non-transitory computer readable medium. The computer-readable medium may include a program command, a data file, a data structure or the like, alone or a combination thereof. For example, the computer-readable medium may be stored in a volatile or non-volatile storage device such as a ROM, a memory such as a RAM, a memory chip, and a device or an integrated circuit, or a storage medium which may be read with a machine (for example, computer) simultaneously with being optically or magnetically recorded like a CD, a DVD, a magnetic disk, a magnetic tape, or the like, regardless of whether it is deleted or again recorded.

In additional, the computer-readable medium may be stored in a computer-readable storage medium of a server, and the computer program may be downloaded to a computing device via network.

According to an embodiment, the methods according to the various embodiments disclosed in the present document may be included and provided in a computer program product. The computer program product may be traded as a product between a seller and a purchaser. The computer program product may be distributed in a form of a storage medium (for example, a compact disc read only memory (CD-ROM)) that may be read by a device or online through an application store (for example, PLAYSTORE). In the case of the online distribution, at least portions of the computer program product may be at least temporarily stored in a storage medium such as a memory of a server of a manufacturer, a server of an application store, or a relay server or be temporarily generated.

A memory which may be included in a refrigerator may be an example of a program including instructions for implementing example embodiments of the present disclosure or a storage medium which is suitable for storing programs and can be read by a machine. The program commands recorded in the computer-readable medium may be designed for the exemplary embodiments or be known to those skilled in a field of computer software.

Although the exemplary embodiments of the present disclosure have been disclosed for illustrative purposes, those skilled in the art will appreciate that various modifications, additions and substitutions are possible, without departing from the scope and spirit thereof as disclosed in the accompanying claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A refrigerator, comprising:
a main body including a storage;
a door hinged to the main body and configured to rotate on a front side of the storage, wherein a front surface of the door includes a display;
a first camera configured to photograph outside of the storage;
a second camera configured to photograph inside of the storage; and
a controller configured to:
control the first camera to capture a first image while the door is closed,
control the second camera to capture a second image,
recognize food information from the first image, and
display on the display the second image tagged with the food information.

2. The refrigerator as claimed in claim 1, further comprising:
a proximity sensor configured to detect an approach of a user with respect to the refrigerator,
wherein the controller configured to control the first camera to capture the first camera in response to detecting the approach of the user.

3. The refrigerator as claimed in claim 2, wherein the proximity sensor is positioned to be adjacent to the first camera.

4. The refrigerator as claimed in claim 1, further comprising;
a proximity sensor to detect an approach of a user with respect to the refrigerator,
wherein the controller is configured further to execute a food management application, in response to detecting the approach of the user.

5. The refrigerator as claimed in claim 1, wherein the controller is further configured to recognize the food information through an artificial intelligence program installed in the controller.

6. The refrigerator as claimed in claim 1, wherein the first camera is inclined from the front surface of the door at a set angle.

7. The refrigerator as claimed in claim 1, wherein the controller is further configured to display on the display the same image.

8. A control method of a refrigerator having a storage, the method comprising:
- detecting that a user is in front of the refrigerator;
- acquiring a first image by photographing an outside view of the storage while a door of the refrigerator is closed in response to detecting the user is in front of the refrigerator;
- acquiring a second image by photographing an inside view of the storage by a second camera
- recognizing food information from the first image;
- displaying image tagged with the food information.

9. A refrigerator, comprising:
- a main body including a storage;
- a memory configured to store a first comparison food image;
- a door hinged to the main body and configured to rotate on a front side of the storage, wherein a front surface of the door includes a display;
- a first camera positioned on the front surface of the door and configured to photograph an article of food to be recognized;
- a second camera positioned on a rear surface of the door that is opposite the front surface and configured to photograph the article of food within the main body; and
- a controller operably connected to the memory, the display, the first camera, and the second camera, wherein the controller is configured to:
  - control the first camera to photograph the article of food while the article of food is external to the main body,
  - control the second camera to photograph the article of food while the article of food is within the main body,
  - preferentially recognize the article of food that is photographed by the first camera according to a food recognition search order by using the first comparison food image in the memory, and
  - display on the display a name of the article of food and an image of the article of food within the main body.

10. The refrigerator as claimed in claim 9, further comprising:
- a communication interface, wherein the controller is further configured to:
  - recognize the article of food photographed by the first camera according to the food recognition search order based on a second comparison food image stored in a memory of an external server connected via the communication interface, and
  - display on the display the name of the article of food based on the second comparison food image.

11. The refrigerator as claimed in claim 10, wherein the controller is further configured to:
- recognize the article of food photographed by the first camera according to the food recognition search order by using a third comparison food image stored in a memory of a store server connected via the communication interface; and
- display on the display the name of the article of food based on the third comparison food image.

12. The refrigerator as claimed in claim 11, wherein the controller is further configured to recognize the article of food photographed by the first camera by using a search engine via the communication interface according to the food recognition search order; and
- display on the display the name of the article of food based on the search engine.

* * * * *